US012743571B2

(12) United States Patent
Jang et al.

(10) Patent No.: US 12,743,571 B2
(45) Date of Patent: Sep. 22, 2026

(54) METHOD AND SYSTEM FOR SIMULATING AND VERIFYING LAYOUT BASED ON DISTRIBUTION

(71) Applicant: Samsung Electronics Co., Ltd., Suwon-si (KR)

(72) Inventors: Hyunjae Jang, Suwon-si (KR); Jongwon Kim, Hwaseong-si (KR); In Huh, Suwon-si (KR); Satbyul Kim, Seoul (KR); Younggu Kim, Hwaseong-si (KR); Yunjun Nam, Suwon-si (KR); Changwook Jeong, Hwaseong-si (KR); Moonhyun Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 716 days.

(21) Appl. No.: 18/151,051

(22) Filed: Jan. 6, 2023

(65) Prior Publication Data

US 2023/0229841 A1 Jul. 20, 2023

(30) Foreign Application Priority Data

Jan. 20, 2022 (KR) ........................ 10-2022-0008691

(51) Int. Cl.

*G06F 30/392* (2020.01)
*G06F 30/398* (2020.01)
*G06F 119/02* (2020.01)

(52) U.S. Cl.

CPC .......... *G06F 30/392* (2020.01); *G06F 30/398* (2020.01); *G06F 2119/02* (2020.01)

(58) Field of Classification Search

CPC ... G06F 30/392; G06F 30/398; G06F 2119/02

(Continued)

(56) References Cited

U.S. PATENT DOCUMENTS

| | | | |
|---|---|---|---|
| 6,470,489 | B1 | 10/2002 | Chang et al. |
| 9,053,276 | B2 | 6/2015 | Mohanty et al. |

(Continued)

FOREIGN PATENT DOCUMENTS

| | | | |
|---|---|---|---|
| KR | 10-2019-0117724 | A | 10/2019 |
| KR | 10-2020-0002303 | A | 1/2020 |

(Continued)

OTHER PUBLICATIONS

Ozan Senser et al., "Active Learning for Convolutional Neural Networks: A Core-Set Approach," ICLR 2018, Jun. 1, 2018.

(Continued)

*Primary Examiner* — Suchin Parihar
(74) *Attorney, Agent, or Firm* — Fish & Richardson P.C.

(57) ABSTRACT

A method for simulating a layout of an integrated circuit manufactured by a semiconductor process includes extracting a plurality of pattern layouts from layout data that defines the layout, generating training data by amplifying the plurality of pattern layouts and at least one parameter provided from the semiconductor process, generating sample data by sampling the training data, generating feature data including a three-dimensional array from the sample data, providing the sample data and the feature data to a simulator and a machine learning model, respectively, and training the machine learning model based on an output of the machine learning model and an output of the simulator.

20 Claims, 23 Drawing Sheets

(58) Field of Classification Search
USPC .......................................................... 716/100
See application file for complete search history.

(56) References Cited

U.S. PATENT DOCUMENTS

| | | | | |
|---|---|---|---|---|
| 10,706,200 | B2 | 7/2020 | Sha et al. | |
| 10,943,049 | B2 | 3/2021 | Chuang et al. | |
| 11,010,529 | B2 | 5/2021 | Salik et al. | |
| 11,042,806 | B1 | 6/2021 | Jiang et al. | |
| 11,914,941 | B2 * | 2/2024 | Salik | G06T 7/001 |
| 12,086,526 | B2 * | 9/2024 | Lee | G06N 20/20 |
| 2014/0282314 | A1 * | 9/2014 | Mohanty | G06F 30/30 716/106 |
| 2016/0246167 | A1 | 8/2016 | Abdo et al. | |
| 2018/0239851 | A1 * | 8/2018 | Ypma | G03F 7/70516 |
| 2020/0380362 | A1 | 12/2020 | Cao et al. | |
| 2021/0174000 | A1 | 6/2021 | Chuang et al. | |
| 2021/0240906 | A1 * | 8/2021 | Salik | G06N 20/00 |
| 2021/0264087 | A1 * | 8/2021 | Jiang | G06F 30/398 |
| 2021/0287120 | A1 | 9/2021 | Mamidi et al. | |
| 2024/0028910 | A1 * | 1/2024 | Nam | G06N 3/10 |
| 2024/0143886 | A1 * | 5/2024 | Kang | G06T 7/0006 |
| 2025/0062966 | A1 * | 2/2025 | Hirohata | H04L 41/145 |

FOREIGN PATENT DOCUMENTS

| | | | |
|---|---|---|---|
| KR | 10-2021-0023641 | A | 3/2021 |
| TW | 201833801 | A | 9/2018 |
| WO | WO-2020/079810 | A1 | 4/2020 |

OTHER PUBLICATIONS

Kevin Scaman, et al., "Lipschitz regularity of deep neural networks: analysis and efficient estimation," Proceedings of the 32nd International Conference on Neural Information Processing Systems, Dec. 2018.
Donggeun Yoo et al., "Learning loss for active learning," 2019 IEEE/CVF Conference on Computer Vision and Pattern Recognition (CVPR), Jun. 15-20, 2019.
Yarin Gal et al., "Deep Bayesian Active Learning with Image Data," Proceedings of the 34th International conference on Machine Learning, Mar. 8, 2017.
Tianyang Gai, et al., "Multi-level layout hotspot detection based on multi-classification with deep learning," Proceedings of SPIE, Feb. 22, 2021.
Notice of Allowance in Korean Appln. No. 10-2022-0008691, mailed on May 20, 2026, 8 pages (with English translation).
Notice of Allowance in Taiwanese Appln. No. 112102268, mailed on Aug. 12, 2026, 9 pages (with machine translation).

* cited by examiner 91
92
L1
L2
L3
L4
L1
L2
L3
L4
IMG4
IMG3
IMG2
IMG1

FIG. 10

IMG4
IMG5
100
CD2
CD1
H
X
Y
Z

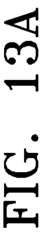
FIG. 13A
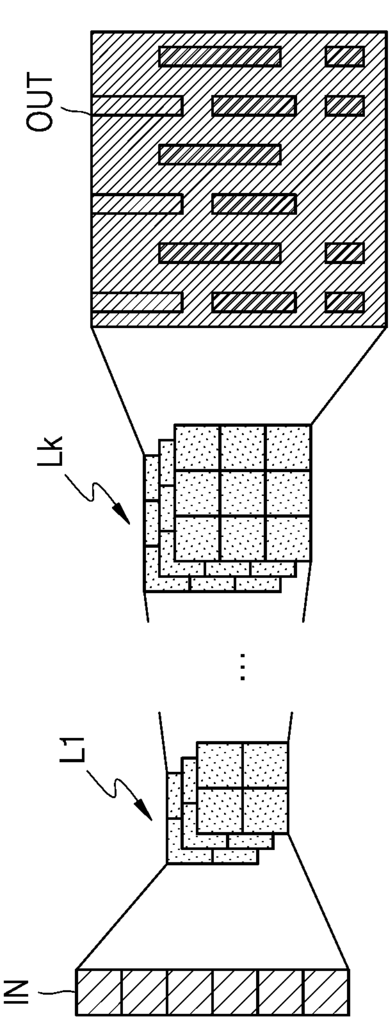
133a
OUT
Lk
L1
IN

METHOD AND SYSTEM FOR SIMULATING AND VERIFYING LAYOUT BASED ON DISTRIBUTION

CROSS-REFERENCE TO RELATED APPLICATION

This application is based on and claims priority under 35 U.S.C. § 119 to Korean Patent Application No. 10-2022-0008691, filed on Jan. 20, 2022, in the Korean Intellectual Property Office, the disclosure of which is incorporated by reference herein in its entirety.

BACKGROUND

The inventive concepts relate to modeling of an integrated circuit, and more particularly, to a method and system for simulating and verifying a distribution-based layout.

Analyzing and verifying, in advance, a layout of an integrated circuit may lead to reducing the development period of the integrated circuit and/or improving the reliability of the integrated circuit. An integrated circuit may be manufactured by a semiconductor process including a series of sub-processes, and the layout of the integrated circuit may be formed differently from a designed layout due to various factors. Estimating the layout of an integrated circuit in advance in consideration of these various factors may require high costs, for example, due to the long time and/or high computing resources. Accordingly, a method of accurately and efficiently estimating the layout of an integrated circuit and verifying the layout of the integrated circuit based on this estimation is researched.

SUMMARY

The inventive concepts provide a method and system for providing efficient verification of the layout of an integrated circuit by accurately and efficiently simulating the layout of the integrated circuit.

According to an aspect of the inventive concepts, there is provided a method for simulating a layout of an integrated circuit manufactured by a semiconductor process, the method including extracting a plurality of pattern layouts from layout data that defines the layout, generating training data by amplifying the plurality of pattern layouts and at least one parameter provided from the semiconductor process, generating sample data by sampling the training data, generating feature data including a three-dimensional array from the sample data, providing the sample data to a simulator and the feature data to a surrogate model, and providing the sample data to a simulator and the feature data to a surrogate model.

According to another aspect of the inventive concepts, there is provided a method for simulating a layout of an integrated circuit manufactured by a semiconductor process, the method including extracting a plurality of pattern layouts from layout data that defines the layout, obtaining at least one distribution of parameters of the semiconductor process, generating feature data from the plurality of pattern layouts and the at least one input parameter, the feature data including a three-dimensional array, providing the feature data to a surrogate model trained based on an output of a simulator, and verifying the layout, based on an output of the surrogate model.

According to another aspect of the inventive concepts, there is provided a system including a non-transitory storage medium storing instructions, and at least one processor configured to execute the instructions such that the at least one processor performs a method for simulating a layout of an integrated circuit.

According to another aspect of the inventive concepts, there is provided a non-transitory computer-readable storage medium including instructions which, when executed by at least one processor, allow the at least one processor to perform a method for simulating a layout of an integrated circuit.

BRIEF DESCRIPTION OF THE DRAWINGS

Example embodiments of the inventive concepts will be more clearly understood from the following detailed description taken in conjunction with the accompanying drawings in which:

FIG. 10 is a view illustrating generation of a new layer according to at least one embodiment;

FIGS. 13A and 13B are block diagrams of surrogate models according to some embodiments;

DETAILED DESCRIPTION OF THE EMBODIMENTS

Figure 1:
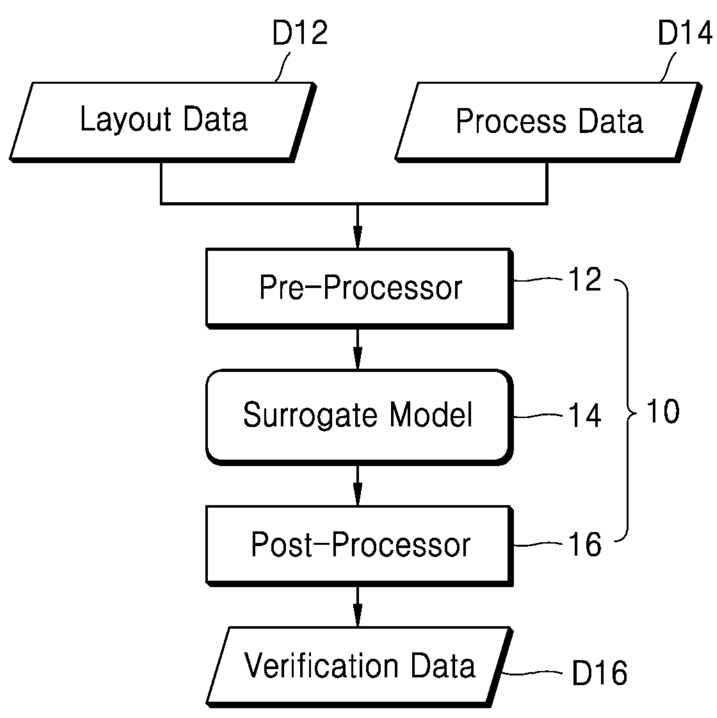
FIG. 1 is a block diagram of a layout simulation of an integrated circuit, according to at least one embodiment.

FIG. 1 is a block diagram of a layout simulation 10 of an integrated circuit, according to at least one embodiment. The layout simulation 10 of the integrated circuit may generate verification data D16 indicating a simulated layout of the integrated circuit, based on not only layout data D12 including geometric information of the layout but also process data D14 derived from a semiconductor process for manufacturing integrated circuits. Herein, the layout of the integrated circuit may simply be referred to as a layout, and a portion of the layout, including at least one structure formed in at least one layer, may be referred to as a pattern (or pattern layout). As illustrated in FIG. 1, the layout simulation 10 may include a pre-processor 12, a surrogate model 14, and a post-processor 16.

According to some embodiments, the layout simulation 10 of FIG. 1 may be implemented by computing systems that will be described later with reference to FIGS. 18 and 19. For example, each of the blocks illustrated in the drawings may correspond to hardware, software, or a combination of hardware and software, which is included in a computing system. According to some embodiments, hardware may include at least one of a programmable component (or processing circuitry) such as a central processing unit (CPU), a digital signal processor (DSP), neural processing unit (NPU), a graphics processing unit (GPU) and/or the like; a reconfigurable component such as a field programmable gate array (FPGA); a component which provides a fixed function such as an intellectual property (IP) block; and/or the like. According to some embodiments, software may include at least one of a series of instructions executable by a programmable component and code convertible into a series of instructions by a compiler and may be stored, e.g., in a non-transitory storage medium.

As the size of a structure included in an integrated circuit decreases, a layout may be more sensitive to various factors. In addition, factors may have distributions, and various factors may differently affect integrated circuits manufactured through a semiconductor process. Simulating the layout of an integrated circuit in consideration of these various factors may require high costs, for example, due to the long time and/or high computing resources utilized during the simulation. As will be described later with reference to the drawings, the layout simulation 10 may include the surrogate model 14 as a machine learning model, and the layout of the integrated circuit may be efficiently simulated through the surrogate model 14. To accurately simulate the layout of the integrated circuit, the surrogate model 14 may be trained to infer output data from input data obtained by pre-processing the layout data D12 and the process data D14.

The layout data D12 may include geometric information about the layout of the integrated circuit. For example, the layout data D12 may have a format defining the layout of the integrated circuit, for example, a graphic design system (GDS). The layout data D12 may define structures formed in a plurality of layers, for example, a substrate, an active layer, and a wiring layer, and thus may define a three-dimensional (3D) structure of the layout. As will be described later, in order for the surrogate model 14 to identify the layout of the integrated circuit, a 3D array may be generated from the layout data D12, and each of the two-dimensional (2D) arrays included in the 3D array may correspond to one layer included in the layout.

The process data D14 may include parameters (for example, a temperature and a flow rate) related to the semiconductor process for manufacturing the integrated circuit. For example, the process data D14 may include parameters that are applied to the sub-processes included in the semiconductor process. The parameters may include parameters for use in controlling the sub-processes and/or may include parameters measured in the semiconductor process. The process data D14 may also include information about distributions of the parameters. For example, the process data D14 may include an average and a variance of a parameter.

The pre-processor 12 may generate input data identifiable by the surrogate model 14 from the layout data D12 and the process data D14. For example, the pre-processor 12 may generate the 3D array from the layout data D12. The pre-processor 12 may obtain the distribution of the parameters, based on the process data D14, and may generate an input parameter from the distribution through sampling. The pre-processor 12 may transform at least a portion of the 3D array, based on the input parameter. Thus, the input data may include information about the 3D structure of the layout and information affecting formation of the layout, and the surrogate model 14 may generate output data by accurately simulating the layout, based on the input data. An illustration of an operation of the pre-processor 12 will be described later with reference to FIG. 14.

The surrogate model 14 may be a machine learning model, may receive the input data from the pre-processor 12 and may infer the output data from the input data. As described above, the input data may include the information affecting formation of the layout, and the surrogate model 14 may generate, from the input data, the output data including information about an estimated layout of the integrated circuit manufactured through the semiconductor process. For example, the output data may include information about a distance (for example, a shortest distance) between structures included in the layout. Herein, the output data generated by the surrogate model 14 may be referred to as label data or as simply a label. Illustrations of the surrogate model 14 will be described later with reference to FIGS. 11, 12, 13A, and 13B.

The surrogate model 14 may be in a trained state based on an output of a simulator. For example, the simulator may simulate the layout of the integrated circuit, based on physical rules, and the output of the simulator may include information about the estimated layout of the integrated circuit manufactured through the semiconductor process. The surrogate model 14 may be trained so that an error between the output of the surrogate model 14 and the output of the simulator decreases. Illustrations of an operation of training the surrogate model 14 will be described later with reference to FIG. 2 and the like.

Herein, the machine learning model may have any structure that is trainable, e.g., with training data. For example, the machine learning model may include an artificial neural network, a decision tree, a support vector machine, a Bayesian network, a genetic algorithm, and/or the like. The machine learning model will now be described by mainly referring to an artificial neural network, but the example embodiments are not limited thereto. Non-limiting examples of the artificial neural network may include a convolution neural network (CNN), a region based convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, a classification network, and/or the like. Herein, the machine learning model may simply be referred to as a model.

The post-processor 16 may generate the verification data D16 from the output data generated by the surrogate model 14. According to some embodiments, the post-processor 16 may generate the verification data D16 including a value representing the reliability of the layout by estimating the output data. For example, Monte Carlo (MC) sampling may be performed by the pre-processor 12, and the post-processor 16 may calculate a standard score, based on a threshold value, from the distribution of the output data. The post-processor 16 may also collect standard scores for a portion of the layout, e.g., a pattern layout, and may generate the verification data D16 including a value representing the reliability of the entire integrated circuit by using the collected standard scores. Illustrations of an operation of the post-processor 16 will be described later with reference to FIGS. 15A through 15C.

As will be described in further detail below, the verification data D16 may be used to verify the layout of a semiconductor device and the process for producing the layout. For example, in some example embodiments, a semiconductor device may be optionally manufactured using the verified process to produce the layout verified using the verification data D16.

Figure 2:
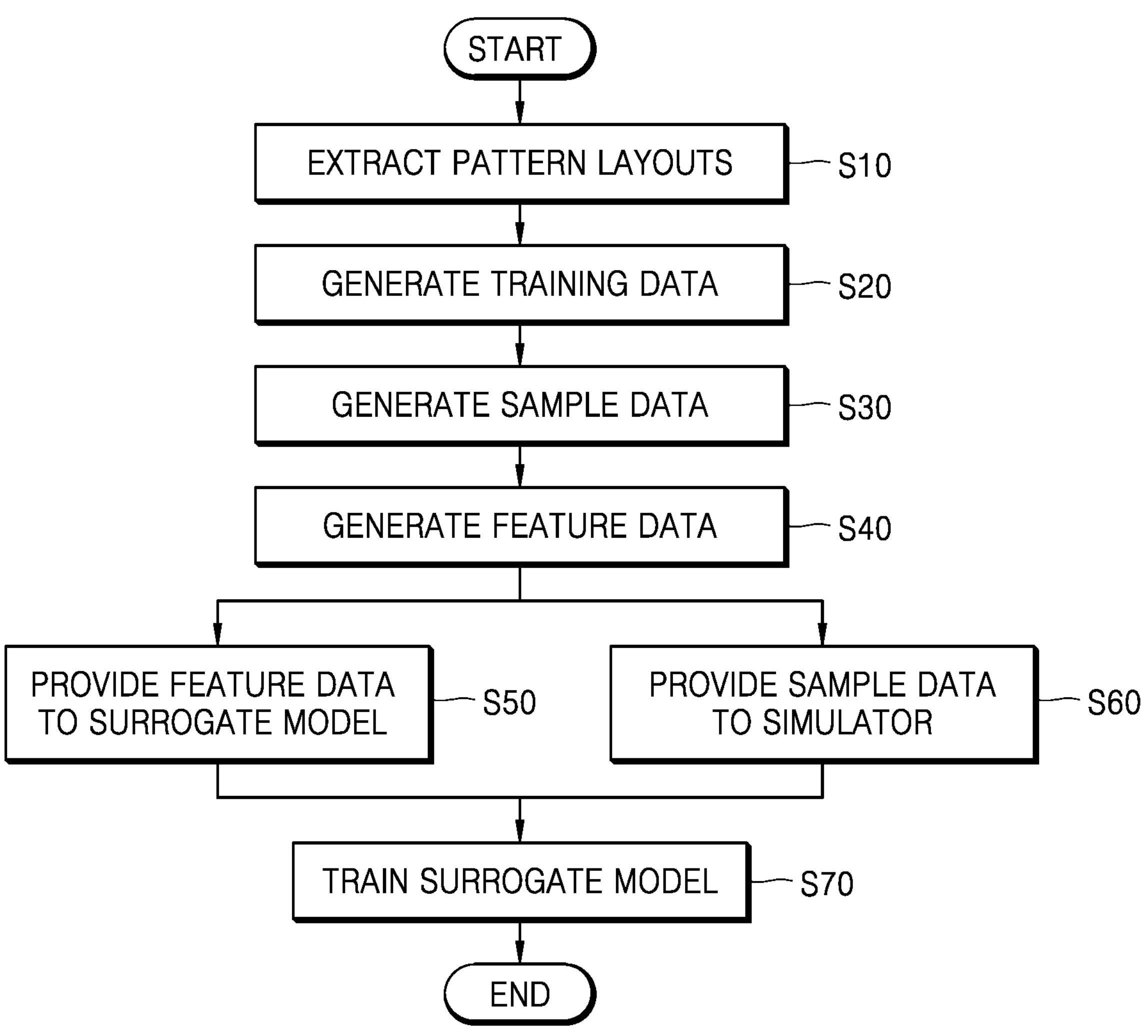
FIG. 2 is a flowchart of a method for layout simulation and verification, according to at least one embodiment.

FIG. 2 is a flowchart of a method for layout simulation and verification, according to at least one embodiment. The flowchart of FIG. 2 illustrates an example method of training the surrogate model 14 of FIG. 1. As described above with reference to FIG. 1, the layout may be accurately simulated through appropriate training of the surrogate model 14. The surrogate model 14 may be trained based on the output of the simulator, and, because long time and high computing resources are used to generate the output of the simulator, the surrogate model 14 may need to be efficiently trained. According to some embodiments, the method of FIG. 2 may be performed by a computer system 180 of FIG. 18. As shown in FIG. 2, the method of FIG. 2 may include a plurality of operations S10 through S70. FIG. 2 will now be described with reference to FIG. 1.

Referring to FIG. 2, in operation S10, pattern layouts may be extracted. For example, a plurality of pattern layouts may be extracted from the layout data D12 defining the 3D structure of the layout. The layout of the integrated circuit may include the same pattern layouts, and/or may include mutually transformed pattern layouts that are not the same as one another but with the same and/or similar properties. In order to verify the overall layout of the integrated circuit, the pattern layouts having the same properties may be grouped into one group (or one class), and a pattern layout representative of the group may be simulated. Due to this pattern grouping, costs for verifying the layout of the integrated circuit may be saved. Illustrations of operation S10 will be described later with reference to FIGS. 3 and 4.

In operation S20, training data may be generated. Herein, the training data may be referred to as data generated to train the surrogate model 14 and may be different from data directly provided to the surrogate model 14, namely, from feature data which will be described later. The training data may include the pattern layouts extracted in operation S10 and may include parameters amplified from at least one parameter included in the process data D14. As described above, it may cost a lot to generate the output of the simulator, and thus training data that may be representative of the entire pool with relatively few experimental points may be beneficial. According to some embodiments, the parameters may be amplified based on a design of experiments (DOE). For example, the at least one parameter included in the process data D14 may be amplified based on high-dimensional sampling such as Latin hypercube sampling (LHS) or Sobol sequence sampling.

In operation S30, sample data may be generated. For example, the sample data may be generated by sampling the training data generated in operation S20. Because it is costly to generate a result of the simulator required to train the surrogate model 14, it may be important to select, from the training data, data that is advantageous for training the surrogate model 14. The sample data may be generated due to active sampling, and the surrogate model 14 may be efficiently trained. Illustrations of operation S30 will be described later with reference to FIG. 7.

In operation S40, the feature data may be generated. The feature data may be data that is provided to the surrogate model 14 and may have a format that is identifiable by the surrogate model 14. For example, the feature data may include the 3D array, and the 2D arrays included in the 3D array may correspond to the layers of the pattern layout, respectively. The feature data may include numerics (e.g., numerical values) for the parameters included in the sample data. According to some embodiments, at least a portion of the 3D array may be transformed based on the numeric of a parameter included in the sample data, and the feature data may include the transformed 3D array. According to some embodiments, two or more 2D arrays corresponding to the layouts of the pattern layout may be generated, and the 3D array may include the generated two or more 2D arrays. Illustrations of operation S40 will be described later with reference to FIGS. 8 through 10.

In operation S50, the feature data may be provided to the surrogate model 14. In operation S60, the sample data may be provided to the simulator. As described above, the feature data may be generated from the sample data so that the surrogate model 14 may identify the feature data, and the surrogate model 14 may generate output data corresponding to the feature data. The simulator may generate output data by performing a series of calculations based on a physical rule by using the pattern layout and the numerics of the parameters included in the sample data.

In operation S70, the surrogate model 14 may be trained. For example, the surrogate model 14 may be trained so that (and/or until) an error (e.g., a difference) between the output data of the surrogate model 14 obtained in operation S50 and the output data of the simulator obtained in operation S60 is reduced.

Figure 3:
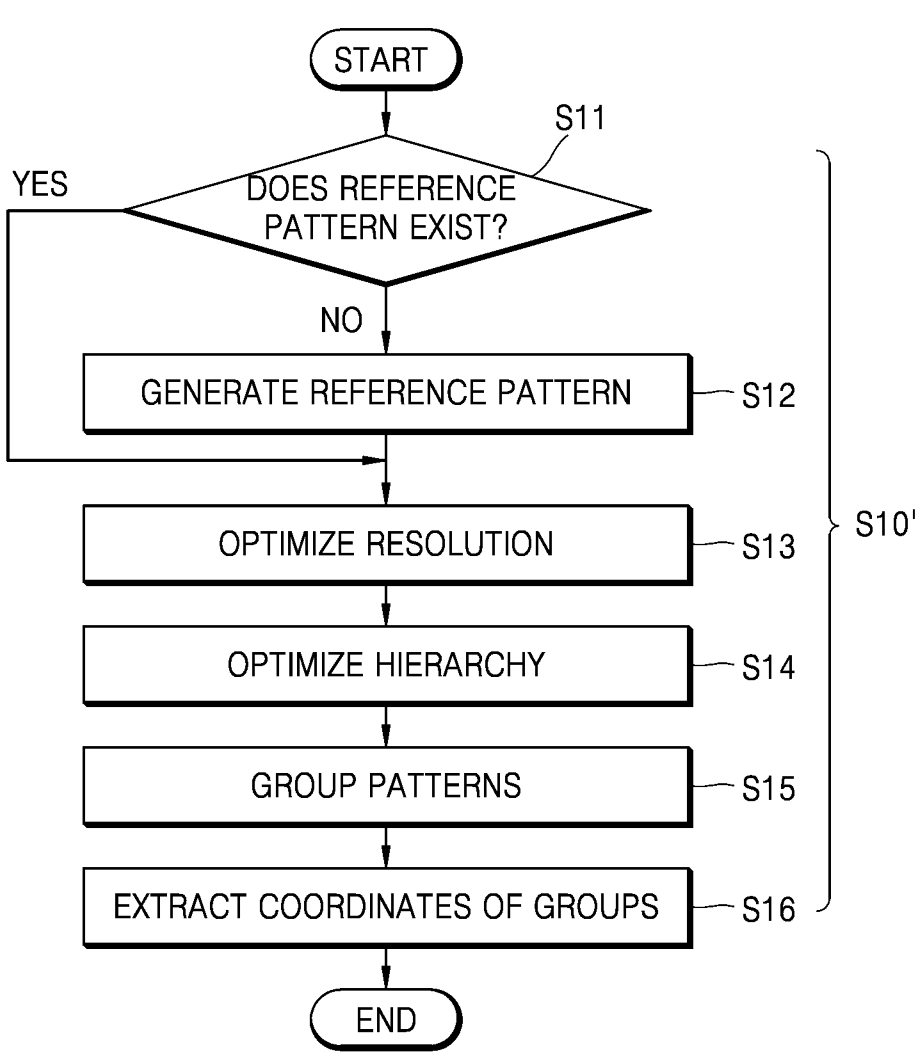
FIG. 3 is a flowchart of a method for layout simulation and verification, according to at least one embodiment.

FIG. 3 is a flowchart of a method for layout simulation and verification, according to at least one embodiment. The flowchart of FIG. 3 illustrates an example of operation S10 of FIG. 2. As described above with reference to FIG. 2, in operation S10' of FIG. 3, pattern layouts may be extracted. As shown in FIG. 3, operation S10' may include a plurality of operations S11 through S16. FIG. 3 will now be described with reference to FIG. 1.

Referring to FIG. 3, in operation S11, a determination as to whether a reference pattern exists may be made. As described above with reference to FIG. 2, pattern grouping may be performed in operation S10', and a reference pattern that is used to compare the pattern layouts with each other may be provided for the pattern grouping. According to some embodiments, the reference pattern may be defined by coordinates indicating a location in the layout of the integrated circuit, and a footprint. As shown in FIG. 3, when the reference pattern exists, operation S13 may be performed, and, on the other hand, when no reference patterns exist, the reference pattern may be generated in operation S12.

In operation S13, resolution optimization (or improvement) may be performed. For example, when the resolution of the layout data D12 is higher than the resolution of the pattern layout desired to be simulated and/or the resolution of the 3D array included in the feature data provided to the surrogate model 14, data having a low resolution may be generated by down-sampling the layout data D12. Accordingly, pattern grouping may be performed on the low-resolution data, and as a result, the costs required for pattern grouping, namely, time and computing resources, may be significantly reduced.

In operation S14, hierarchy optimization (or improvement) may be performed. According to some embodiments, the layout data D12 may have a hierarchy. For example, the layout data D12 may define a plurality of blocks according to function and/or structure, and one block may include a plurality of cells and wirings interconnecting the plurality of cells. A cell may refer to a unit of a layout designed to perform a predefined (or otherwise defined) function and may be referred to as a standard cell. The hierarchy included in the layout data D12 may be removed for pattern grouping, and this hierarchy removing operation may be referred to as flattening. Herein, operations S13 and S14 may be collectively referred to as an operation of pre-processing the layout data D12.

In operation S15, patterns may be grouped. For example, patterns in the data generated by pre-processing the layout data D12 in operations S13 and S14 may be grouped. Patterns identical to the reference pattern and patterns that are not identical to the reference pattern but have the same properties as the reference pattern may be identified. For example, Euclidean-transformed and/or rigid-transformed patterns from the reference pattern may be grouped into one group.

In operation S16, the coordinates of groups may be extracted. For example, a plurality of groups may be generated in operation S15, and a pattern representative of each of the plurality of groups may be selected from each of the plurality of groups. The coordinates of the selected pattern may be referred to as a pattern of each group. An illustration of operations S15 and S160 will now be described with reference to FIG. 4.

Figure 4:
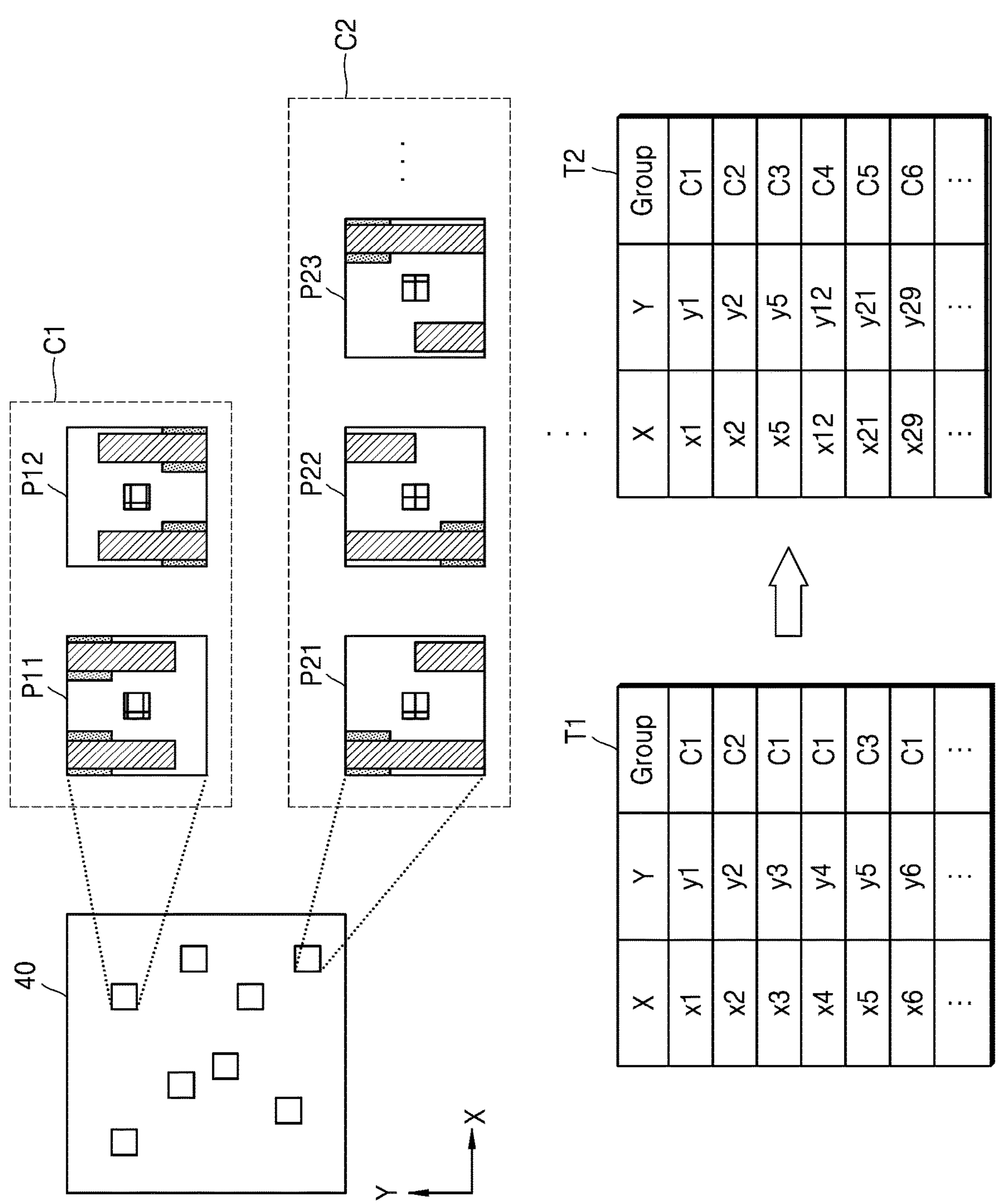
FIG. 4 is a view illustrating pattern grouping according to at least one embodiment.

FIG. 4 is a view illustrating pattern grouping according to at least one embodiment. As described above with reference to FIG. 3, the patterns that are the same as the reference pattern or have the same properties as the reference pattern may be grouped into one group. FIG. 4 will now be described with reference to FIG. 3.

Referring to FIG. 4, a layout 40 of an integrated circuit may include a plurality of patterns, and the patterns may be grouped according to shapes. For example, as shown in FIG. 4, a first group C1 may include two patterns P11 and P12 extracted from the layout 40, and a second group C2 may include three or more patterns P21, P22, and P23 extracted from the layout 40. The pattern P12 in the first group C1 may correspond to a shape obtained by rotating the pattern P11 by 180 degrees and/or a shape obtained by reflecting the pattern P11 about an axis parallel to an X axis. Accordingly, the patterns P11 and P12 in the first group C1 may have common properties. Similarly, the pattern P22 in the second group C2 may correspond to a shape obtained by reflecting the pattern P21 about the axis parallel to the X axis. The pattern P23 may correspond to a shape obtained by rotating the pattern P22 by 180 degrees. Accordingly, the patterns P21, P22, and P23 in the second group C2 may have common properties.

Herein, a plane made up of an X-axis and a Y-axis may be referred to as a horizontal plane, a component arranged in a +Z direction relative to another component may be referred to as being above the other component, and a component arranged in a −Z direction relative to another component may be referred to as being below the other component. The area of a component may refer to a size occupied by the component on a plane parallel to the horizontal plane, and the width of the component may refer to a length occupied by the component on the plane parallel to the horizontal plane. A surface of a component exposed in the +Z direction may be referred to as an upper surface, a surface of the component exposed in the −Z direction may be referred to as a lower surface, and a surface of the component exposed in the X-axis direction or the Y-axis direction may be referred to as a side surface. In the drawings, only some layers may be shown for convenience of illustration.

According to some embodiments, the coordinates of the patterns included in one group may be collected. For example, as shown in a first table T1 of FIG. 4, the coordinates of the patterns included in the first group C1 may be collected, the coordinates of the patterns included in the second group C2 may be collected, and the coordinates of the patterns included in a third group C3 may be collected. According to some embodiments, the patterns may correspond to the same window (or footprint) on the plane made up of the X-axis and the Y-axis, and the coordinates of the patterns may correspond to the coordinates of the window. Next, the coordinates of groups may be extracted. For example, as in a second table T2 of FIG. 4, the coordinates of one pattern from the patterns included in one group, namely, a representative pattern, may correspond to the coordinates of the group. Thus, the coordinates of each of a plurality of groups including first through sixth groups C1 through C6 may be extracted, and a pattern corresponding to the coordinates of the group may be used to not only train the surrogate model 14 but also infer the surrogate model 14 to achieve layout simulation.

Figure 5:
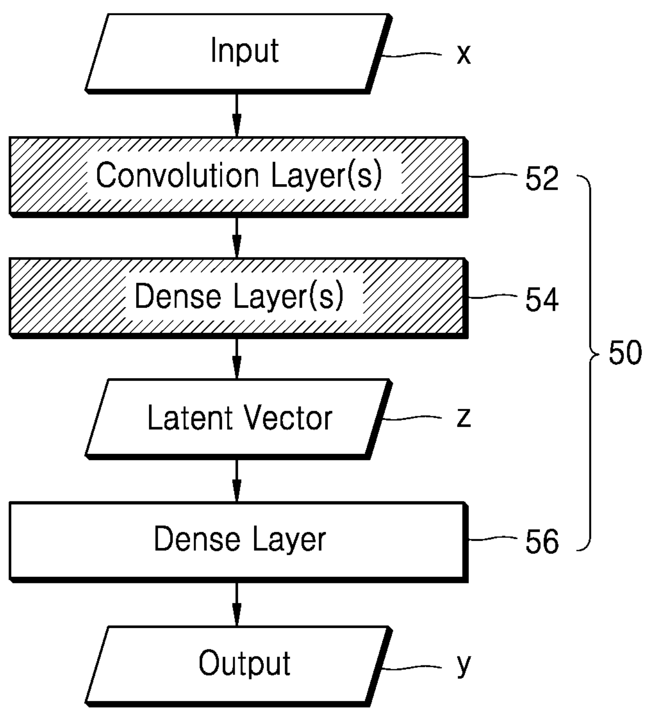
FIG. 5 is a diagram illustrating a surrogate model according to at least one embodiment.
Figure 6:
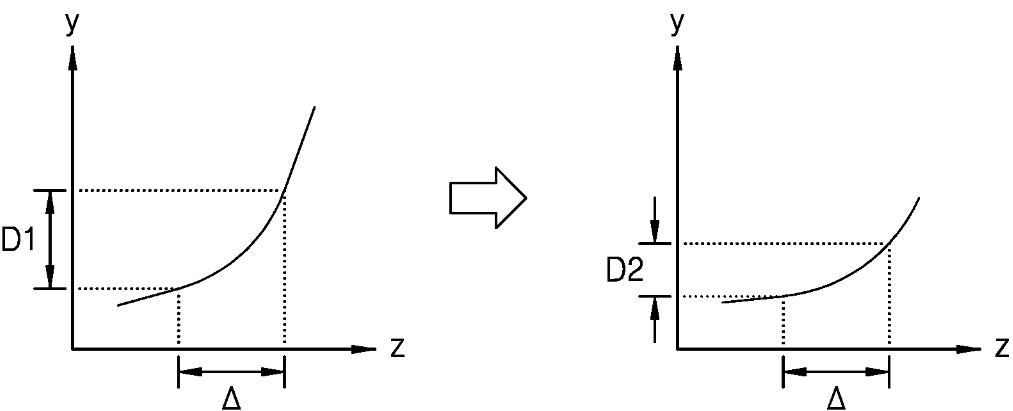
FIG. 6 is a schematic view illustrating a latent space according to at least one embodiment.

FIG. 5 is a view illustrating a surrogate model according to at least one embodiment, and FIG. 6 is a schematic view illustrating a latent space according to at least one embodiment.

As described above with reference to FIG. 2, active sampling may be performed to select data advantageous for training a surrogate model 50. According to some embodiments, the active sampling may be performed based on diversity. For example, the active sampling may be performed so that samples for training are evenly distributed without overlapping and/or being biased, namely, so that a distance between the samples increases. As described above, data representing a layout, for example, an image, may be used for layout simulation, and, because the image has a high dimension, it may not be easy to define a distance between samples. Accordingly, the image may be mapped to a point (which may be hereinafter referred to as a latent vector) in a lower dimensional space (which may be hereinafter referred to as a latent space), and distance-based sampling may be performed in the lower dimensional space. For example, clustering, for example, k-center, k-medoid, and/or k-means, of latent vectors may be performed in the latent space, and samples may be selected from each of clusters.

A latent variable may be obtained from a hidden layer of the surrogate model 50. For example, as shown in FIG. 5, the surrogate model 50 may receive an input x (for example, feature data) as an input, and may output an output y. The surrogate model 50 may include at least one convolution layer 52 and at least one dense layer 54 each having an activation function and may further include a dense layer 56 having no activation functions. Data provided to the dense layer 56 having no activation functions, namely, a latent vector z, may be clustered.

According to some embodiments, active sampling may be performed so that not only an input (e.g., feature data) provided to a surrogate model but also an output of the surrogate model is distributed evenly. To this end, the latent space may be Lipschitz-regularized, and clustering may be performed in the Lipschitz-regularized latent space. Lipschitz regularization may refer to reducing the Lipschitz constant of a latent space connecting an input and an output to each other. When the rate of change of a continuous function is bounded, the continuous function may be referred to as a Lipsitz continuous function, and a bound constant of the Lipsitz continuous function may be referred to as a Lipsitz constant. For example, $\lambda_f$ in Equation 1 below may be a Lipschitz constant of a function f.

$$d_y(f(x_1), f(x_2)) \leq \lambda_f d_x(x_1, x_2) \quad \text{[Equation 1]}$$

In Equation 1, dx and dy may be metrics defined in x and y.

When the Lipschitz constant decreases, samples that are close to each other in an input space may also be close to each other in an output space. For example, as in the left graph of FIG. 6, when the Lipschitz constant is relatively high, a difference Δ in the latent vector z may correspond to a relatively large difference D1 in the output y, whereas, as in the right graph of FIG. 6, when the Lipschitz constant is relatively low, the difference Δ in the latent vector z may correspond to a relatively small difference D2 in the output y (D2<D1). Consequently, when samples are evenly extracted from the Lipsitz regularized latent space, the samples may be evenly extracted from both the input space and the output space.

Referring back to FIG. 5, the surrogate model 50 may be the function f mapping the input x to the output y, the at least one convolution layer 52 and the at least one dense layer 54 each having an activation function may be non-linear functions g mapping the input x to the latent vector z, and the dense layer 56 having no activation functions may be a linear function h mapping the latent vector z to the output y. When the functions g and h capable of reducing both an empirical risk (for example, a mean squared error (MSE)) of $h^\circ$ g and the Lipschitz constant of the function h are provided, samples that are closed to each other in a latent space formed by the function g may correspond to outputs that are close to each other even in an output space. Consequently, the latent space of the latent vector z may be a space advantageous for active sampling.

According to some embodiments, the Lipschitz constant may be calculated based on a gradient. For example, as introduced in the paper "Lipschitz regularity of deep neural networks: analysis and efficient estimation," (K. Scaman and A. Virmaux, In Proceedings of the 32nd International Conference on Neural Information Processing Systems (NeurIPS), 2018), a gradient-based Lipschitz constant may be calculated.

The surrogate model 50 may be trained so that a good output y is generated and the Lipschitz constant of the latent space decreases. For example, the surrogate model 50 may be trained so that the value of Equation 2 decreases.

$$\frac{1}{|S|}\sum_{j \in S} \mathcal{L}(x_j, y_j; f) + \eta \cdot \lambda_h \quad \text{[Equation 2]}$$

In Equation 2, S is a selected sample set, L is a standard loss function (for example, a mean squared error (MSE)), $\lambda_h$ is the Lipschitz constant of the function h, and η is a regularized weight. Latent vectors provided by the hidden layer of the surrogate model 50 trained as described above may be collected and may be clustered in the latent space. Samples may be selected from clusters, and the selected samples may be added to the selected sample set S in Equation 2. The calculation, clustering, and sample selection in Equation 2 may be repeated until a predefined condition is satisfied.

Figure 7:
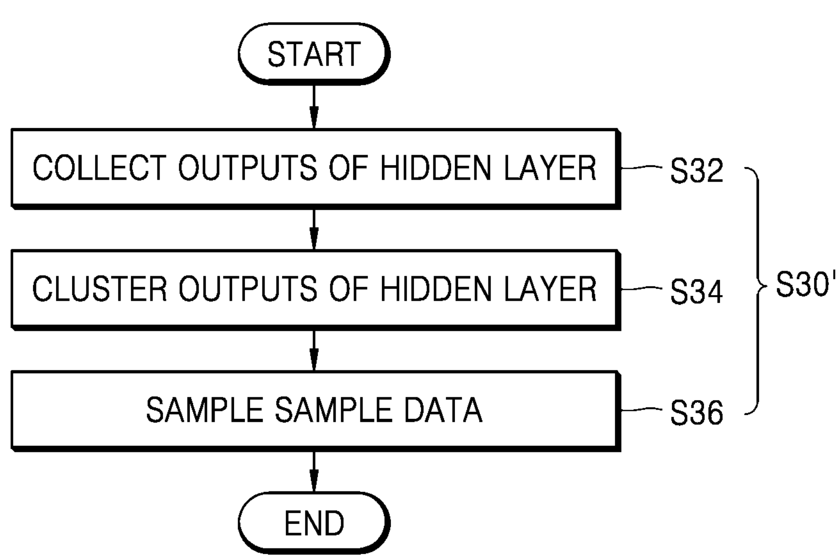
FIG. 7 is a flowchart of a method for layout simulation and verification, according to at least one embodiment.

FIG. 7 is a flowchart of a method for layout simulation and verification, according to an embodiment. In detail, the flowchart of FIG. 7 illustrates an example of operation S30 of FIG. 2. As described above with reference to FIG. 2, in operation S30', sample data may be generated. As shown in FIG. 7, operation S30' may include a plurality of operations S32, S34, and S36. FIG. 7 will now be described with reference to FIG. 5.

Referring to FIG. 7, in operation S32, outputs of a hidden layer may be collected. For example, as described above with reference to FIG. 5, active sampling may be performed based on clustering in a latent space, and the latent space may be defined by the latent vector z provided to the dense layer 56 having no activation functions from among the hidden layers of the surrogate model 50. According to some embodiments, the surrogate model 50 may be trained so that the Lipschitz constant decreases, and thus the samples close to each other in the input space may correspond to the outputs close to each other in even the output space.

In operation S34, the outputs of the hidden layer may be clustered. For example, as described above with reference to FIG. 5, latent vectors in the latent space may be clustered based on a distance (for example, a Euclidean distance). According to some embodiments, clustering may be performed based on any manner based on distance, such as k-means, k-medoid, k-center, and/or the like.

In operation S36, sample data may be sampled. For example, a sample may be selected from the clusters generated in operation S34, and sample data corresponding to the selected sample may be sampled. Accordingly, sample data that do not overlap each other or are not biased may be sampled from training data, and training of the surrogate model 50 may be performed more efficiently.

Figure 8:
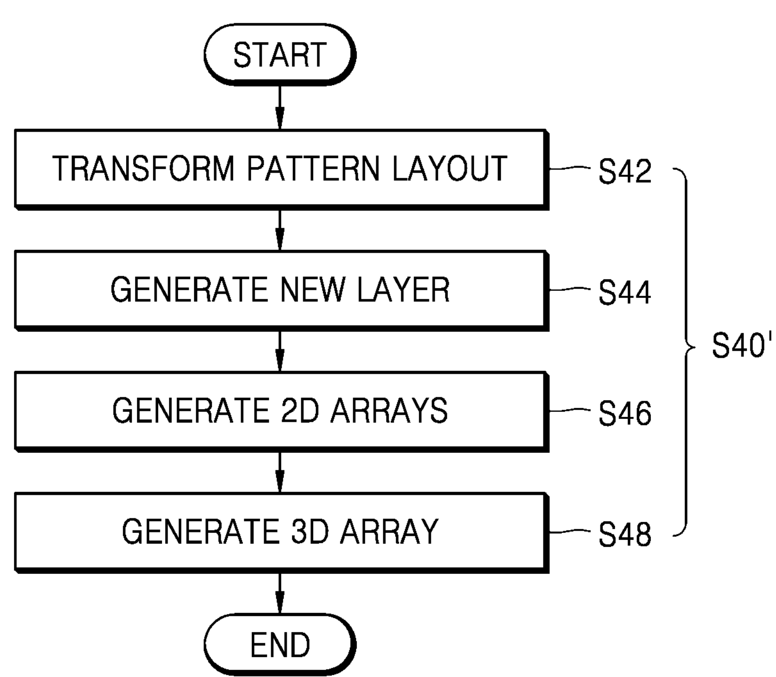
FIG. 8 is a flowchart of a method for layout simulation and verification, according to at least one embodiment.

FIG. 8 is a flowchart of a method for layout simulation and verification, according to at least one embodiment. The flowchart of FIG. 8 illustrates an example of operation S40 of FIG. 2. As described above with reference to FIG. 2, in operation S40' of FIG. 8, feature data may be generated. As shown in FIG. 8, operation S40' may include a plurality of operations S42, S44, S46, and S48. According to some embodiments, operation S42 and/or operation S44 may be omitted in operation S40'. FIG. 8 will now be described with reference to FIG. 1.

Referring to FIG. 8, in operation S42, a pattern layout may be transformed. For example, parameters derived from the semiconductor process may include a parameter related to the 2D shape of the layout, e.g., the shape of the plane made up of the X-axis and the Y-axis. For example, the parameters may include a width (for example, a critical dimension (CD)), an X-axis shift, and/or a Y-axis shift of a structure with respect to each of the plurality of layers. The parameters affecting the 2D shape of the layout as described above may be used to transform the pattern layout, instead of being directly provided to the surrogate model 14. An illustration of operation S42 will be described later with reference to FIG. 9.

In operation S44, a new layer may be generated. For example, the new layer may be generated from at least one layer from among the plurality of layers included in the pattern layout. The parameters derived from the semiconductor process may include a parameter that may be expressed in the 2D shape of the layout. For example, a structure formed in a layer may have a tapered shape of which a horizontal width becomes narrower from top to bottom (or from bottom to top), and the parameters may include a parameter defining the tapered shape. The parameter defining the tapered shape may be used to create a new layer corresponding to the tapered shape, instead of being provided directly to the surrogate model 14. An illustration of operation S44 will be described later with reference to FIG. 10.

In operation S46, 2D arrays may be generated. For example, a plurality of 2D arrays respectively corresponding to a plurality of layers including the layers transformed in operation S42 or generated in operation S44 may be generated. One layer may include a portion in which the structure is formed and a portion in which no structures are formed, and a 2D array may correspond to an image including a value according to the presence or absence of the structure in corresponding coordinates. According to some embodiments, the 2D array may include real numbers and may include intermediate values at coordinates corresponding to the boundary of the structure.

In operation S48, a 3D array may be generated. For example, a 3D array including the 2D arrays generated in operation S46 may be generated, the 3D array may represent the 3D structure of the layout. The 3D array may include a 2D array corresponding to the layer transformed in operation S42 and a 2D array corresponding to the new layer generated in step S44, and thus may accurately represent the 3D structure of a layout in which a process distribution has been reflected. As described above with reference to FIG. 2, the 3D array may be included in the feature data and provided to the surrogate model 14.

Figure 9:
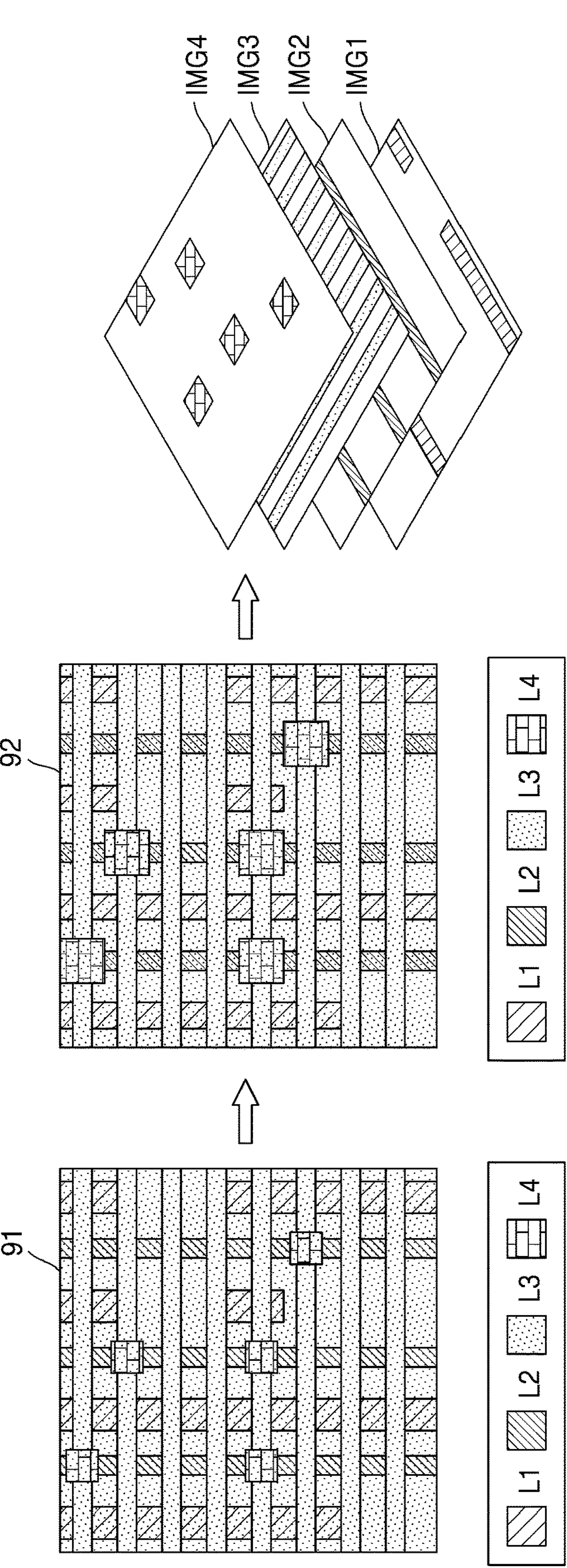
FIG. 9 is a view illustrating transformation of a layer according to at least one embodiment.

FIG. 9 is a view illustrating transformation of a layer according to at least one embodiment. As described above with reference to FIG. 8, a pattern layout may be transformed based on at least one parameter. In FIG. 9, a 2D array is expressed as an image for convenience of illustration. FIG. 9 will now be described with reference to FIG. 1.

Referring to FIG. 9, a first pattern layout 91 may be defined by the layout data D12 of FIG. 1. As shown in FIG. 9, the first pattern layout 91 may include structures respectively formed in first through fourth layers L1 through L4. The parameters included in the process data D14 may include a parameter indicating a distribution for a change in a width of the fourth layer L4. When a value corresponding to an extension of the width of the fourth layer L4 is sampled by active sampling, the structures of the fourth layer L4 in the first pattern layout 91 may be transformed to have extended widths, and accordingly, a second pattern layout 92 may be generated from the first pattern layout 91. Next, four 2D arrays respectively corresponding to the first through fourth layers L1 through L4, namely, first through fourth images IMG1 through IMG4, may be generated. As shown in FIG. 9, the fourth image IMG4 corresponding to the fourth layer L4 may represent the structures having extended widths.

Figure 10:
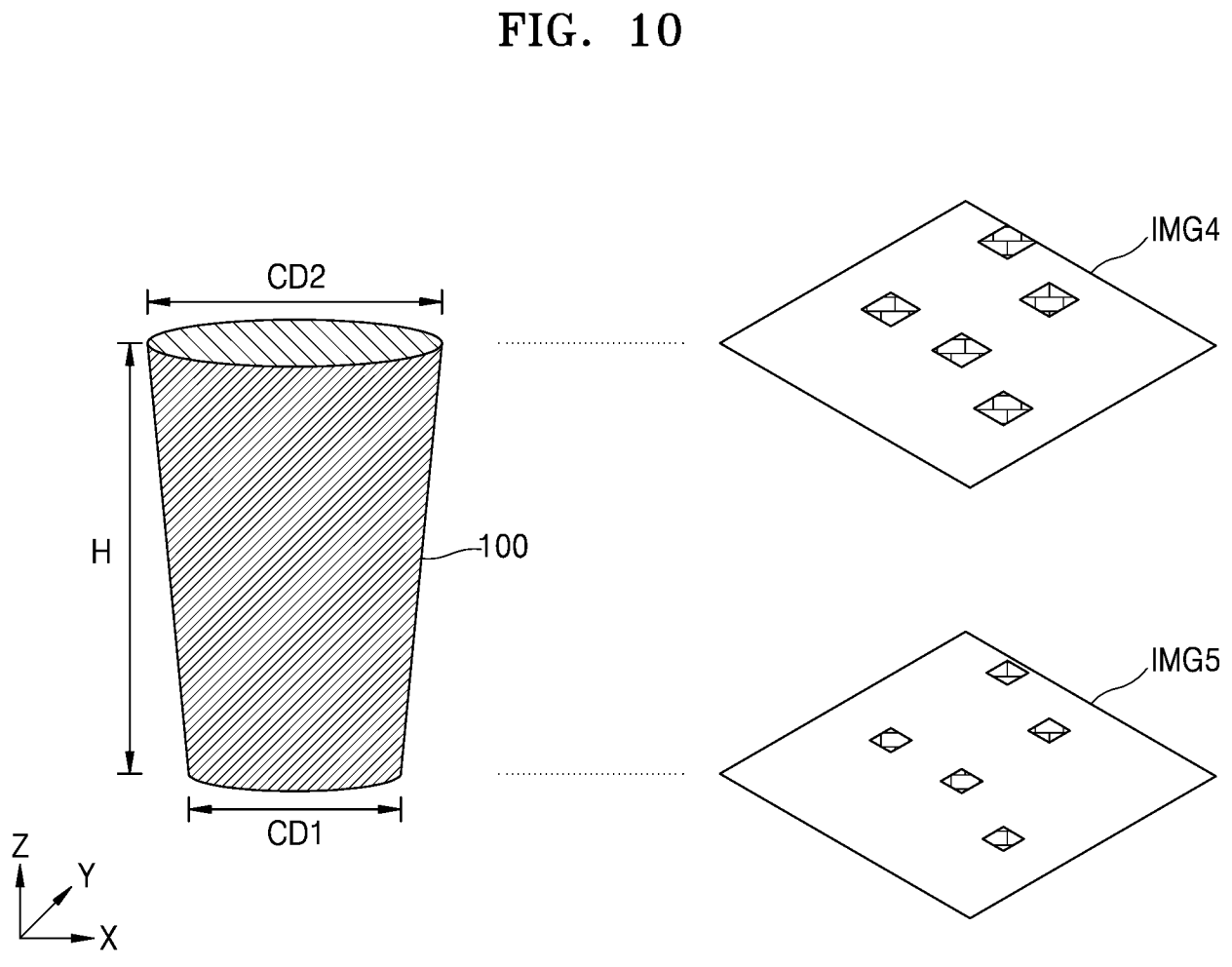

FIG. 10 is a view illustrating generation of a new layer according to at least one embodiment. As described above with reference to FIG. 8, the new layout may be generated from the layers included in the pattern layout, based on a parameter. In FIG. 10, a 2D array is expressed as an image for convenience of illustration. FIG. 10 will now be described with reference to FIG. 1.

Referring to FIG. 10, a structure 100 formed in one layer may have a tapered shape of which a horizontal width becomes narrower from the top to the bottom. For example, as shown in FIG. 10, the structure 100 may include an upper surface having a first width CD1 and a lower surface having a second width CD2, and the second width CD2 may be less than the second width CD1 (CD2<CD1). The parameter may define an amount by which the width of the structure 100 with respect to a unit height (e.g., a unit length in the Z-axis direction) decreases, and the second width CD2 may be calculated from an image corresponding to the upper surface of the structure 100 and a height H that is identified from the layout data D12. Thus, a fifth image IMG5 may be newly generated from a fourth image IMG4 representing the upper surface, and this may be referred to as newly generation of a layer corresponding to the fifth image IMG5. Consequently, the surrogate model 14 may receive not only the fourth image IMG4 but also the fifth image IMG5, and accurate information about the 3D structure of the layout may be provided to the surrogate model 14.

Figure 11:
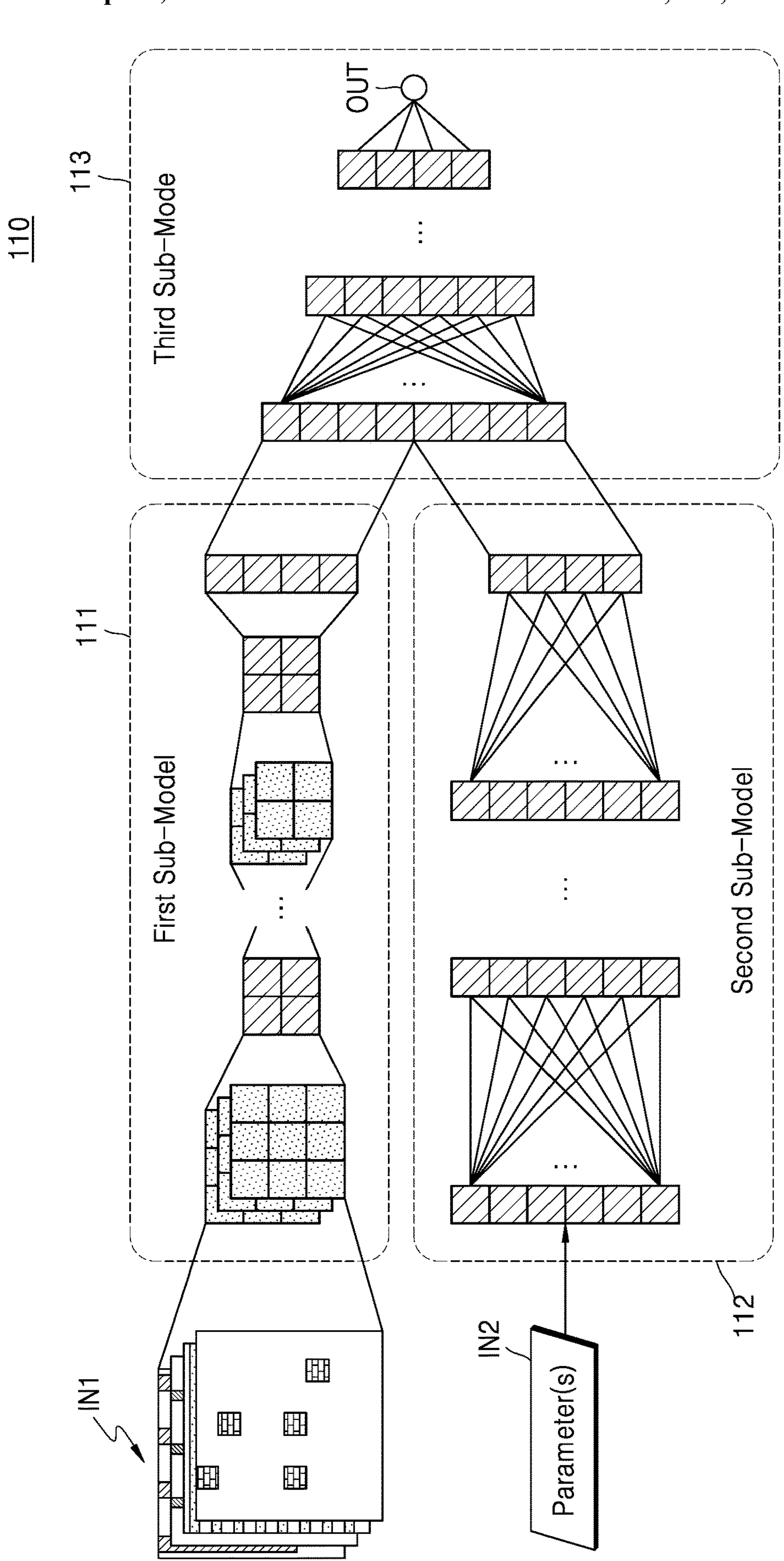
FIG. 11 is a view illustrating a surrogate model according to at least one embodiment.

FIG. 11 is a view illustrating a surrogate model according to at least one embodiment. As described above with reference to the drawings, a surrogate model 110 may receive feature data and may generate an output OUT.

Referring to FIG. 11, the feature data may include a first input IN1 corresponding to a 3D array, and a second input IN2 corresponding to at least one parameter. The surrogate model 110 may include a first sub-model 111, a second sub-model 112, and a third sub-model 113. The first sub-model 111 may receive the first input IN1, and the second sub-model 112 may receive the second input IN2. According to some embodiments, the first sub-model 111 may include a convolutional neural network (CNN) to learn the 3D array. According to some embodiments, the second sub-model 112 may include a fully connected neural network to learn the numerics for the parameters. Outputs of the first sub-model 111 and the second sub-model 112 may be concatenated with each other and provided to the third sub-model 113. According to some embodiments, the third sub-model 113 may include a fully connected neural network to learn the numerics for the parameters.

Figure 12:
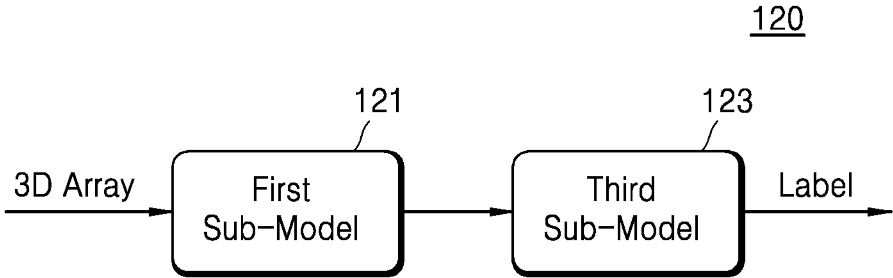
FIG. 12 is a block diagram of a surrogate model according to at least one embodiment.

FIG. 12 is a block diagram of a surrogate model according to at least one embodiment. The surrogate model may have a different structure from the surrogate model 110 of FIG. 11 according to the format of an input that is provided to the surrogate model. For example, as shown in FIG. 12, a surrogate model 120 may receive a 3D array but may not receive the numerics for the parameters. Accordingly, the surrogate model 120 may include a first sub-model 121 and a third sub-model 123, but a sub-model corresponding to the second sub-model 112 of FIG. 11 may be omitted from the surrogate model 120. A layer for concatenation may also be omitted from the third sub-model 123, and the third sub-model 123 may output a label from an output of the first sub-model 121.

Figure 13B:
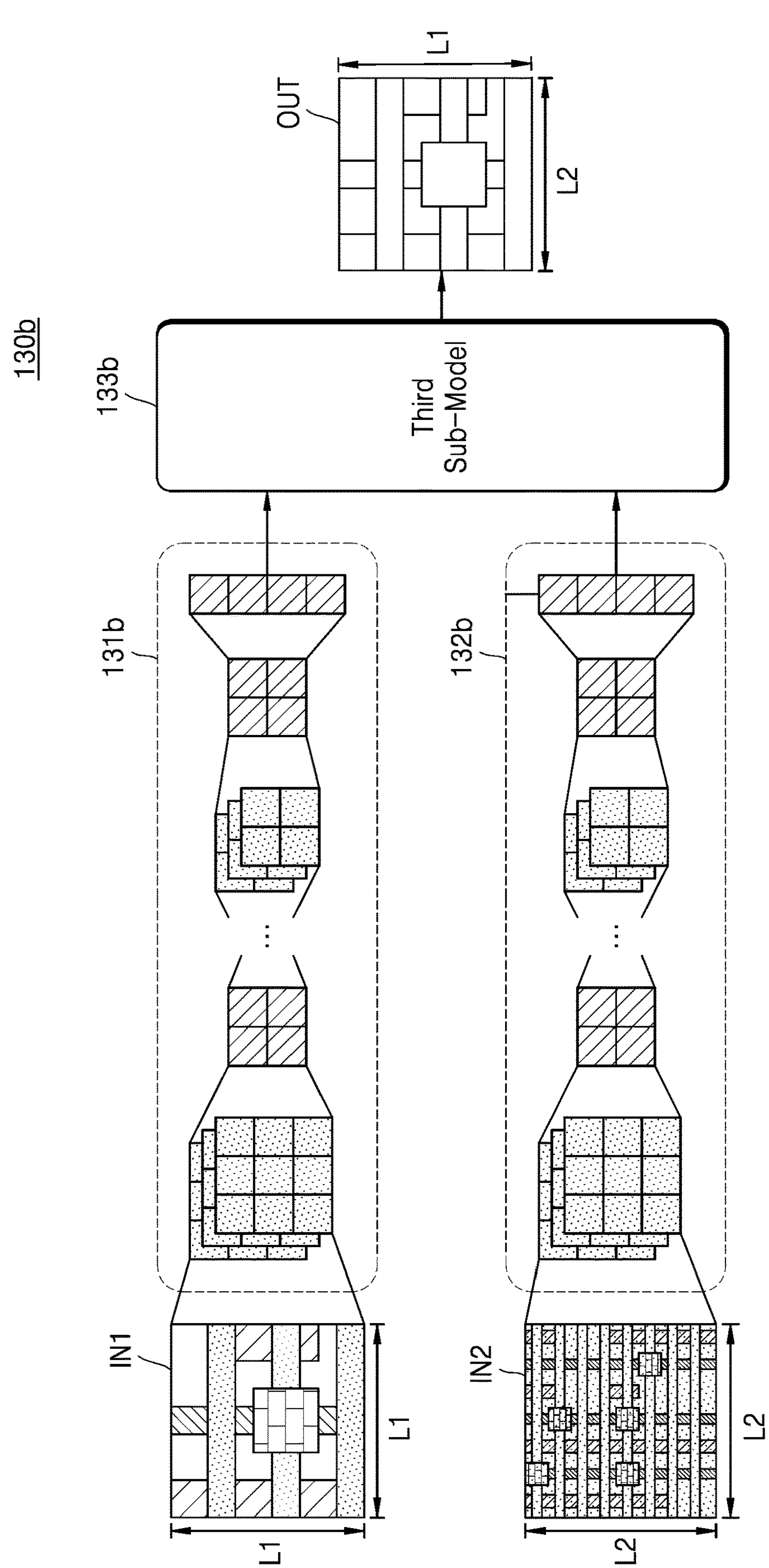

FIGS. 13A and 13B are block diagrams of surrogate models according to embodiments. In detail, the block diagram of FIG. 13A illustrates a third sub-model 133*a* included in a surrogate model that outputs a 2D image, and the block diagram of FIG. 13B illustrates a surrogate model 130*b* that outputs a 2D image.

Referring to FIG. 13A, the surrogate model may generate a 2D image as an output OUT, differently from the above-described illustrations. For example, the third sub-model 113 of FIG. 11 may be replaced by the third sub-model 133*a* of FIG. 13A, and the third sub-model 133*a* of FIG. 13A may include layers L1 through Lk (where k is an integer greater than 1) that sequentially perform deconvolution on an input IN.

Referring to FIG. 13B, the surrogate model 130*b* generating a 2D image as an output OUT may receive images having two different sizes. The range of an image represented by the output OUT may be associated with the sizes of the images provided to the surrogate model 130*b*. When an image provided to the surrogate model 130*b* and the image represented by the output OUT have the same sizes, information loss may occur in the output OUT due to a boundary condition. In order to prevent this information loss, the surrogate model 130*b* may receive an image having a size larger than that of the output OUT.

As shown in FIG. 13B, the surrogate model 130*b* may include a first sub-model 131*b*, a second sub-model 132*b*, and a third sub-model 133*b*. The first sub-model 131*b* may receive a first input IN1 corresponding to an image of a L1×L1 size, whereas the second sub-model 132*b* may receive a second input IN2 corresponding to an image of a L2×L2 size. The image of the second input IN2 may be larger than that of the first input IN1 (L2>L1). Thus, information loss in the output OUT corresponding to the image of the L1×L1 size may be prevented.

Figure 14:
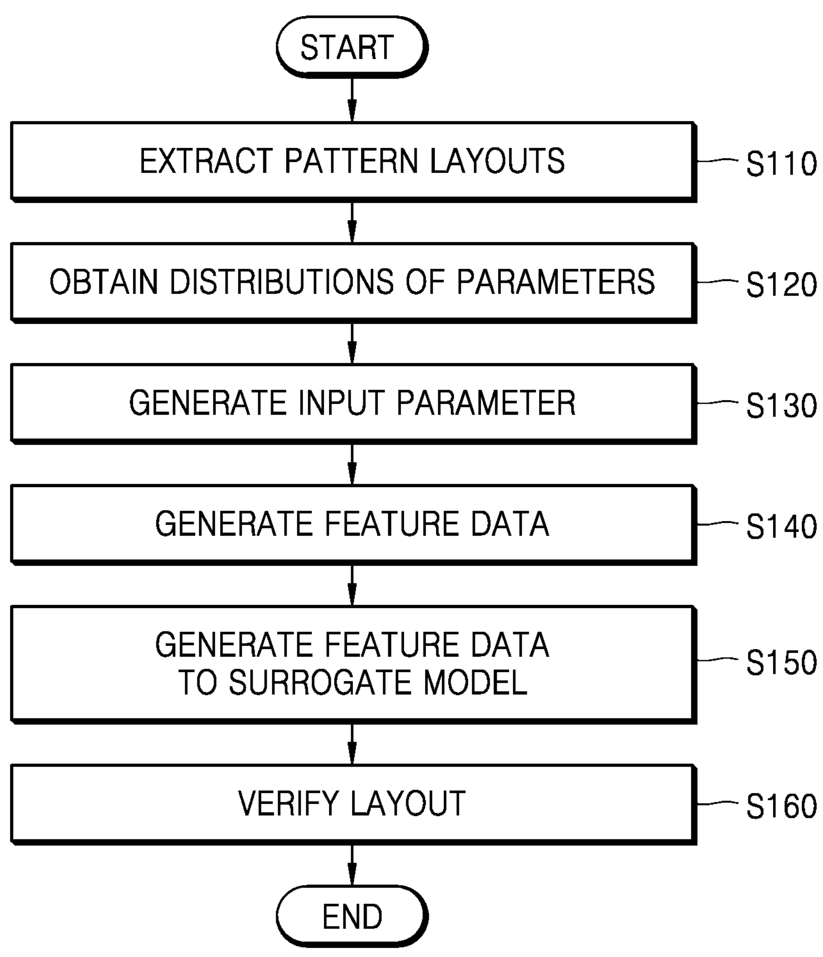
FIG. 14 is a flowchart of a method for layout simulation and verification, according to at least one embodiment.

FIG. 14 is a flowchart of a method for layout simulation and verification, according to at least one embodiment. The flowchart of FIG. 14 illustrates a method of simulating a layout by using a surrogate model. As shown in FIG. 14, the method of simulating a layout may include a plurality of operations S110 through S160. According to some embodiments, operations S110 through S150 of FIG. 14 may be performed by the pre-processor 12 of FIG. 1, and operation S160 may be performed by the post-processor 16 of FIG. 1. FIG. 14 will now be described with reference to FIG. 1.

Referring to FIG. 14, in operation S110, pattern layouts may be extracted. For example, the pre-processor 12 may extract the pattern layouts from the layout data D12. According to some embodiments, as described above with reference to FIGS. 3 and 4, pattern layouts having the same properties in the layout defined by the layout data D12 may be grouped into one group, and pattern layouts respectively representative of the groups may be identified.

In operation S120, distributions of parameters may be obtained. For example, a mean and a variance defining the distribution of a parameter may be obtained from a semiconductor process for manufacturing an integrated circuit.

In operation S130, an input parameter may be generated. As described above, a parameter may have a distribution, and thus a parameter to be provided to the surrogate model 14, e.g., the input parameter, may be sampled. According to some embodiments, for MC simulation, MC sampling may be performed, and thus an input parameter may be generated from a distribution of a parameter.

In operation S140, feature data may be generated. The feature data may be data that is provided to the surrogate model 14 and may include a 2D image for a pattern and at least one input parameter. According to some embodiments, as described above with reference to FIG. 9, the pre-processor 12 may generate a 2D image by transforming at least one layer. According to some embodiments, as described above with reference to FIG. 10, the pre-processor 12 may generate the 2D image by generating at least one new layer. The pre-processor 12 may generate 2D arrays respectively corresponding to images and may generate a 3D array including the 2D arrays.

In operation S150, the feature data may be provided to the surrogate model 14. For example, the pre-processor 12 may provide the feature data generated in operation S140 to the surrogate model 14. The feature data may include the 3D array and the at least one input parameter, and the trained surrogate model 14 may generate an output in response to the feature data.

In operation S160, the layout may be verified. For example, the post-processor 16 may verify the layout, based on the output generated by the surrogate model 14 in response to the feature data provided in operation S150, and may generate verification data. A value indicating reliability of the pattern layout may be calculated, and the calculated value may be shared by pattern layouts included in the same group.

To verify the layout of the integrated circuit, reliability values may be collected, and the reliability of the entire layout may be verified based on the collected reliability values. Illustrations of operation S160 will be described later with reference to FIGS. 15A through 15C.

Figure 15A:
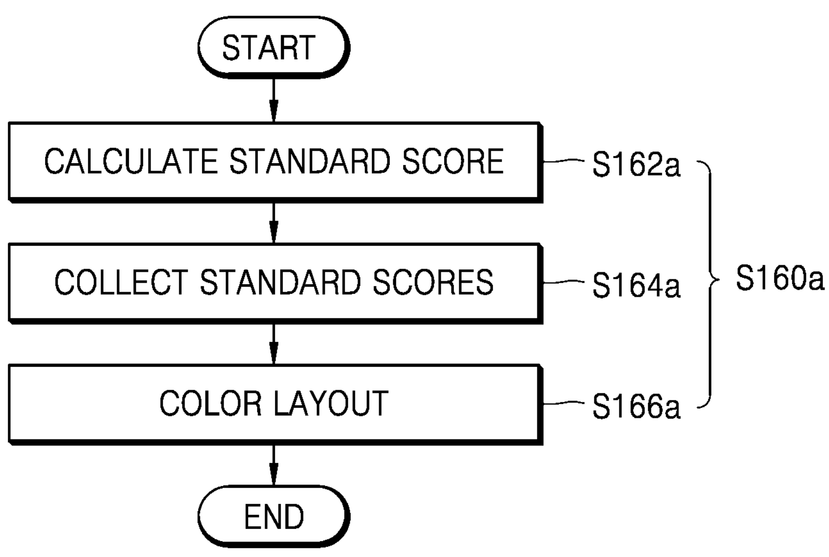
FIGS. 15A through 15C are flowcharts of illustrations of a method for layout simulation and verification, according to some embodiments.
Figure 15B:
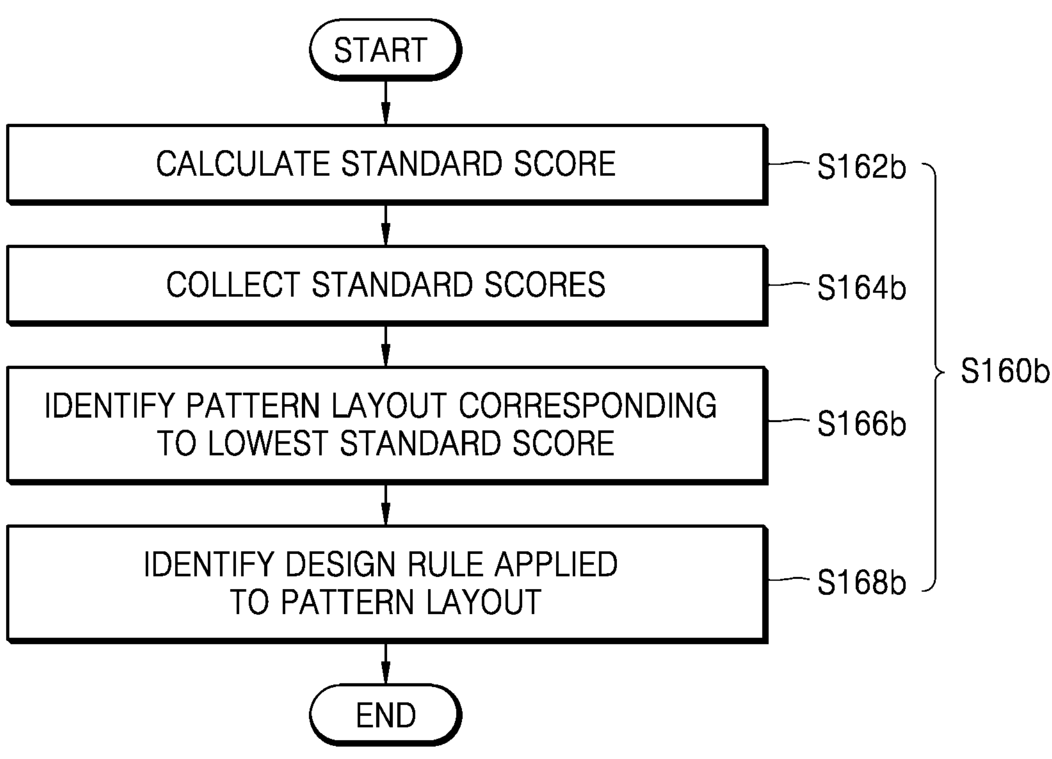
Figure 15C:
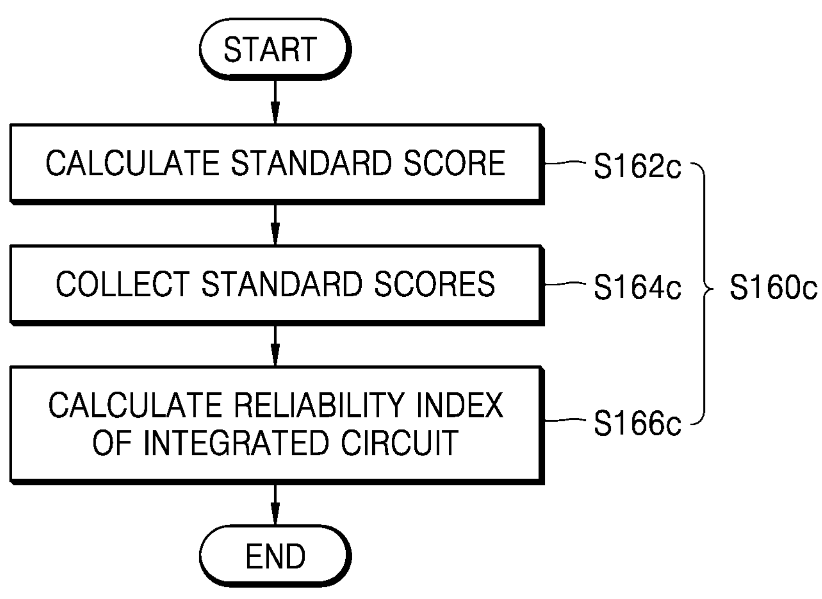

FIGS. 15A through 15C are flowcharts of illustrations of a method for layout simulation and verification, according to some embodiments. In detail, the flowcharts of FIGS. 15A through 15C illustrate examples of operation S160 of FIG. 14. As described above with reference to FIG. 14, a layout may be verified in operations S160*a*, S160*b*, and S160*c* of FIGS. 15A through 15C. According to some embodiments, operations S160*a*, S160*b*, and S160*c* of FIGS. 15A through 15C may be performed by the post-processor 160 of FIG. 1, and FIGS. 15A through 15C will now be described with reference to FIG. 1. Overlapping descriptions between FIGS. 15A through 15C will now be omitted.

Referring to FIG. 15A, operation 160*a* may include a plurality of operations S162*a*, S164*a*, and S166*a*. In operation S162*a*, a standard score may be calculated. The standard score may be referred to as a Z-score and may be calculated based on a threshold value. For example, when the output of the surrogate model 14 represents a distance between two structures, the threshold value may be defined as an allowed minimum distance, and layouts providing distances less than the threshold value may be considered defective. According to some embodiments, the threshold value may be determined based on a yield or the like of the semiconductor process. When the threshold value is Thr, the probability that a probability variable x is lower than the threshold value Thr may be expressed using a standard value z as shown in Equation 3 below.

$$p(x < Thr) = p\left(z < \frac{Thr - \mu}{\sigma}\right) = p(z < -EZ) \quad \text{[Equation 3]}$$

In Equation 3, σ may be a variance of a probability distribution, and μ may be a mean of the probability distribution. When the output of the surrogate model 14 follows a Gaussian distribution, a standard score may be calculated as described above. On the other hand, when the output of the surrogate model 14 does not follow a Gaussian distribution, the standard score may be calculated in different methods, as described later with reference to FIGS. 16A and 16B.

In operation S164*a*, standard scores may be collected. The standard score calculated in operation S162*a* may correspond to one group of pattern layouts, and standard scores respectively corresponding to a plurality of groups may be collected. To this end, feature data corresponding to each of the plurality of groups may be provided to the surrogate model 14, and the standard score may be calculated from the output of the surrogate model 14.

In operation S166*a*, the layout may be colored. For example, different colors may be added to the pattern layouts according to the standard scores collected in operation S164*a*, and thus the layout of the integrated circuit may be colored. A user may easily identify, from the colored layout, locations where defects are highly likely to occur in the overall layout. The verification data D12 may include information about the colored layout. In some embodiments, output of the surrogate model (e.g., the verification data D16 of FIG. 1, the standard scores, and/or the colored layout) may be used to identify areas of high potential for defects such that a layout and/or process may be identified as unsatisfactory. For example, the standard scores and/or the colored layout may be used to determine whether a change to the layout of the semiconductor device and/or a change in the production of the semiconductor device may improve or deteriorate the performance of the resulting semiconductor device. In some example embodiments, for example, a layout and/or process may be confirmed based on these predictions thereby indicating that the layout and/or process is verified to proceed to manufacture, and/or the process may be paused (and/or stopped) if, e.g., a change in the layout and/or process would result in a characteristic of the semiconductor devices would increase the probability of defects forming beyond an acceptable threshold and/or that the deteriorating below an acceptable threshold value. In some embodiments, when the layout and/or process are confirmed, the semiconductor device may be manufactured based on the confirmed layout using the confirmed process. In some embodiments, the standard scores and/or the colored layout may be used to identify a solution, e.g., a change that would reduce and/or minimize the potential for defects.

In some example embodiments, the verification data D16 of the layout simulation 10 and/or the simulator may be (e.g., periodically) compared to a semiconductor device manufactured based on a layout data D12 and a process data D14 representing a test example, to confirm the accuracy of the surrogate model 14. In some example embodiments, if the prediction and the manufactured semiconductor device differ, e.g., beyond a maximum acceptable threshold, the surrogate model 14 may be, e.g., updated (e.g., trained and/or re-trained) based on the manufactured semiconductor device and/or devices, the process, and/or on uncertainty data.

Referring to FIG. 15B, operation 160*b* may include a plurality of operations S162*b*, S164*b*, S166*b*, and S168*b*. Similar to operation S162*a* of FIG. 15A, in operation S162*b*, a standard score may be calculated. Similar to operation S164*a* of FIG. 15A, in operation S164*b*, standard scores may be collected.

In operation S166*b*, a pattern layout corresponding to a lowest standard score may be identified. For example, the post-processor 16 may identify the lowest standard score from among the standard scores collected in operation S164*b*. According to some embodiments, the post-processor 16 may identify not only the lowest standard score but also standard scores that are less than a predefined (or otherwise defined) reference (for example, bottom 10%). The post-processor 16 may identify the pattern layout corresponding to the lowest standard score.

In operation S168*b*, a design rule applied to the pattern layout may be identified. The layout data D12 may be generated to comply with a predefined design rule. The pattern layout corresponding to the lowest standard score may have a weak structure, and accordingly, the design rule may be modified to correct the pattern layout. For example, when a minimum distance between structures is identified as a design rule that caused the lowest standard score, the design rule may be modified to increase the minimum distance between the structures, and accordingly the layout data D12 may be re-generated according to the modified design rule. The verification data D16 may include information about the lowest standard score and the pattern layout identified in operation S166*b* and/or information about the design rule identified in operation S168.

Referring to FIG. 15C, operation 160*c* may include a plurality of operations S162*c*, S164*c*, and S166*c*. Similar to operation S162*a* of FIG. 15A, in operation S162*c*, a standard score may be calculated. Similar to operation S164*a* of FIG. 15A, in operation S164*c*, standard scores may be collected.

In operation S166*c*, a reliability index of the integrated circuit may be calculated. For example, the reliability index of the integrated circuit may be calculated from the standard scores collected in operation S164*c*. According to some embodiments, the reliability index of the integrated circuit may be defined as in Equation 4 below.

$$EZ\left(\frac{E[N_{Fail\_count}]}{N_{Pattern}}\right) \quad \text{[Equation 4]}$$

In Equation 4, $N_{Fail\_count}$ is the number of defective patterns in the layout of the entire integrated circuit, $N_{Pattern}$ is the total number of patterns of the entire integrated circuit, E is an expected value, and EZ is an effective standard score function. $E[N_{Fail\_count}]$ in Equation 4 may be calculated using Equation 5 below.

$$E[N_{Fail}] = \sum_{n=1}^{N_{Unique}} N_n \times P_{Fail}(n) = \sum_{n=1}^{N_{Unique}} N_n \times EZ^{-1}(ez_n) = EZ\left(\sum_{n=1}^{N_{Unique}} \frac{N_n}{N_{Total}} \times P_{Fail}(n)\right) = EZ\left(\sum_{n=1}^{N_{Unique}} a_n EZ^{-1}(ez_n)\right) \quad \text{[Equation 5]}$$

In Equation 5, $N_n$ is the number of n-th patterns, $P_{Fail}(n)$ is the probability of failure of an n-th pattern, and $ez_n$ is an effective standard score of the n-th pattern. The verification data D12 may include information about the reliability index of the integrated circuit calculated in operation S166*c*.

Figure 16A:
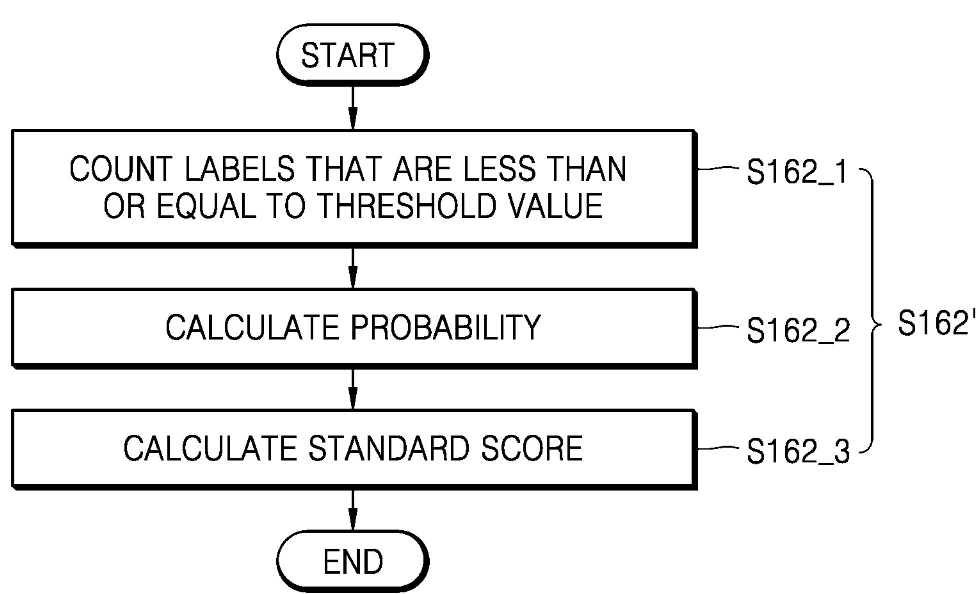
FIGS. 16A and 16B are flowcharts of illustrations of a method for layout simulation and verification, according to some embodiments.
Figure 16B:
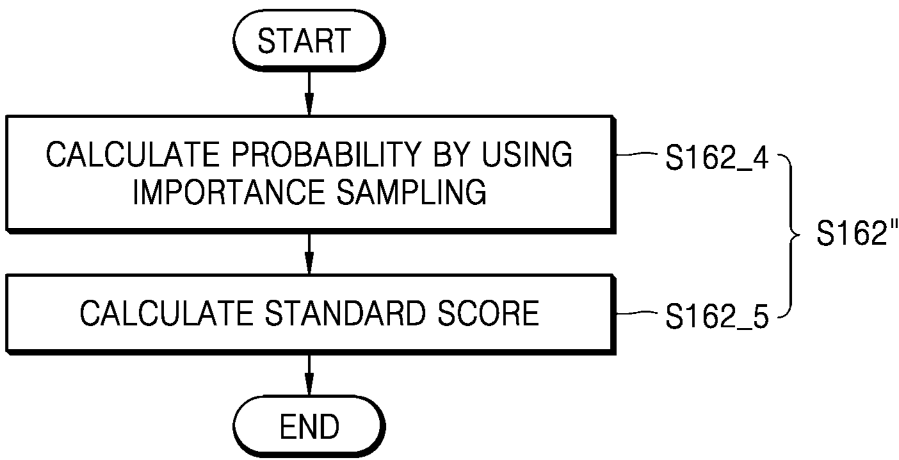

FIGS. 16A and 16B are flowcharts of illustrations of a method for layout simulation and verification, according to some embodiments. The flowcharts of FIGS. 16A and 16B illustrate examples of a method of calculating a standard score. As described above with reference to FIG. 15A, when the output of the surrogate model 14 follows a Gaussian distribution, the standard score may be calculated as in Equation 3. On the other hand, when the output of the surrogate model 14 does not follow a Gaussian distribution, the standard score may be calculated in operation S162' of FIG. 16A or in operation S162" of FIG. 16B.

Referring to FIG. 16A, operation 162' may include a plurality of operations S162_1, S162_2, and S162_3. In operation S162_1, labels that are less than or equal to a threshold value may be counted. In operation S162_2, a probability may be calculated. In operation S162_3, the standard score may be calculated. Labels that are less than the threshold value among labels (e.g., outputs of the surrogate model 14) may be counted, and accordingly, a ratio of the labels that are less than the threshold value to all of the labels may be calculated. The calculated ratio may be regarded as a probability of the probability distribution, and thus a standard score corresponding to the probability may be calculated.

Referring to FIG. 16B, operation S162" may include operation S162_4 and operation S162_5. In operation S162_4, the probability may be calculated using importance sampling. In operation S162_5, the standard score may be calculated. When occurrence of the labels less than the threshold value is extremely rare, it may not be easy to obtain the probability. The probability may be calculated using advanced sampling such as importance sampling, and a standard score corresponding to the probability may be calculated.

Figure 17:
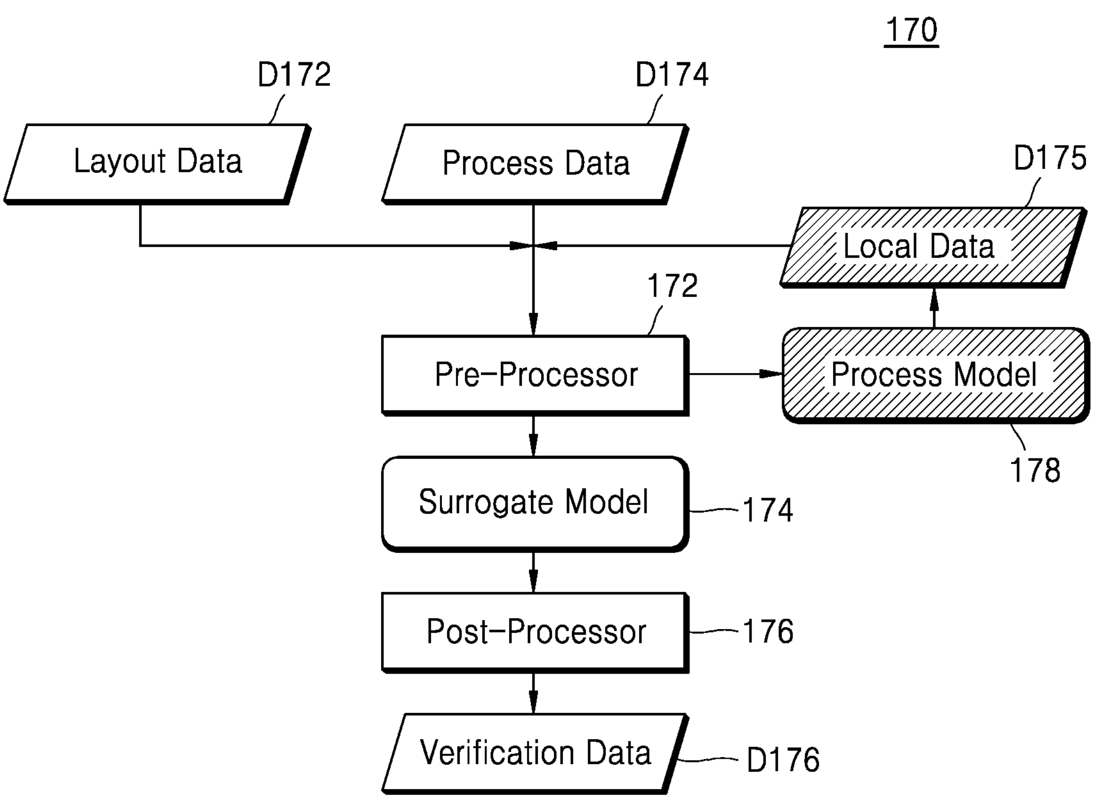
FIG. 17 is a block diagram of a layout simulation of an integrated circuit, according to at least one embodiment.

FIG. 17 is a block diagram of a layout simulation 170 of an integrated circuit, according to at least one embodiment. As illustrated in FIG. 1, the layout simulation 170 may include a pre-processor 172, a surrogate model 174, a post-processor 176, and a process model 178. Compared with the layout simulation 10 of FIG. 1, the layout simulation 170 of FIG. 17 may further include the process model 178 generating local data D175. Descriptions of FIG. 17 that are the same as given above with reference to FIG. 1 will be omitted.

As described above with reference to the drawings, a pattern layout may be simulated, and thus the reliability of the pattern layout may be verified. When the same pattern layouts in the overall layout of the integrated circuit are respectively disposed at different locations, the pattern layouts may have different properties. For a simulation considering these local influences, the local data D175 together with process data D174 may be provided to the pre-processor 172, and the local data D175 may be generated by the process model 178.

The process model 178 is a machine learning model and may be trained to generate the local data D175. For example, the process model 178 may be trained based on pieces of data generated by measuring an integrated circuit manufactured by a semiconductor process. The trained process model 178 may receive a pattern layout from the pre-processor 172 and may generate the local data D175 from the pattern layout. The pre-processor 172 may generate feature data, based on not only parameters included in the process data D174 but also parameters included in the local data D175, and may provide the feature data to the surrogate model 174.

Figure 18:
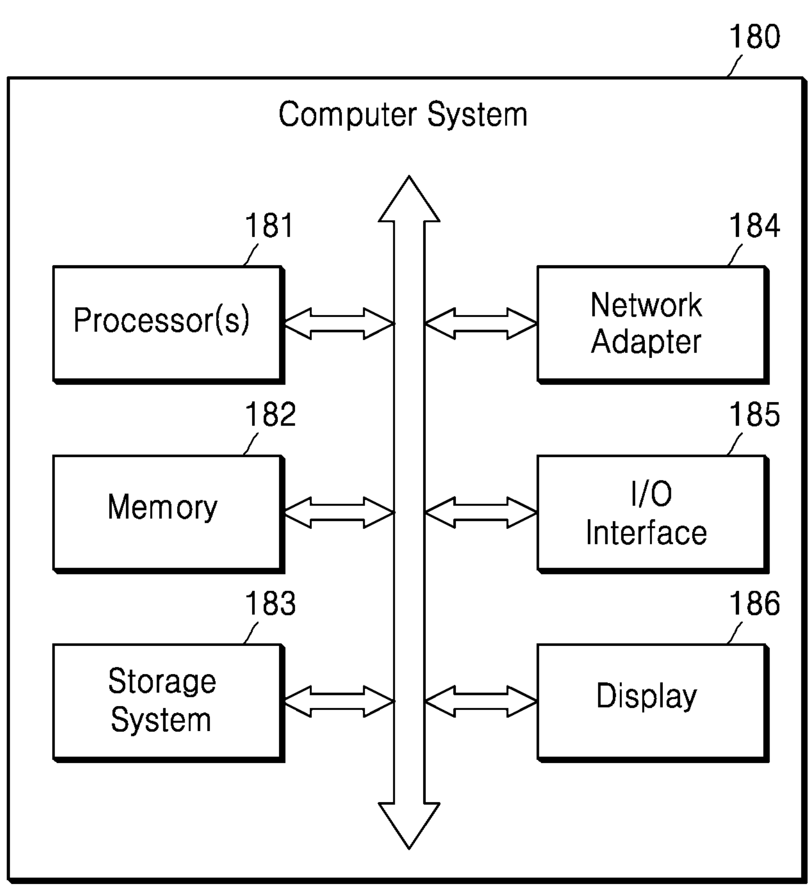
FIG. 18 is a block diagram of a computer system according to at least one embodiment.

FIG. 18 is a block diagram of the computer system 180 according to at least one embodiment. According to some embodiments, the computer system 180 of FIG. 18 may perform training of machine learning models used in a layout simulation described above with reference to the drawings and may be referred to as a layout simulation system or a training system.

The computer system 180 may refer to a system including a general-purpose or special-purpose computing system. For example, the computer system 180 may include (and/or be included in) a personal computer (PC), a server computer, a laptop computer, an appliance product, and/or the like. Referring to FIG. 18, the computer system 180 may include at least one processor 181, a memory 182, a storage system 183, a network adapter 184, an input/output (I/O) interface 185, and a display 186.

The at least one processor 181 may execute a program module including an instruction executable by a computer system. The program module may include routines, programs, objects, components, a logic, and a data structure, which perform a certain operation or implement a certain abstract data format. The memory 182 may include a computer system-readable medium of a volatile memory type such as random-access memory (RAM). The at least one processor 181 may access the memory 182 and may execute instructions loaded into the memory 182. The storage system 183 may non-volatilely store information, and according to some embodiments, may include at least one program product including a program module configured to perform training of machine learning models for the layout simulation described above with reference to the drawings. Non-limiting examples of a program may include an operating system (OS), at least one application, other program modules, and other program data, and/or the storage system 183 may store the surrogate model 174 which the at least one processor 181 accesses.

The network adapter 184 may provide an access to a local area network (LAN), a wide area network (WAN), and/or a common network (for example, Internet). The I/O interface 185 may provide a communication channel for communication with a peripheral device such as a keyboard, a pointing device, and/or an audio system. The display 186 may output various pieces of information for a user to check. Though functional blocks are illustrated as separate, the embodiments of the computer system 180 are not limited thereto. For example, the computer system 180 may include more or fewer functional blocks, and/or the functional blocks may be integrated (e.g., the I/O interface 186 and the display 186).

According to some embodiments, training of machine learning models for the layout simulation described above with reference to the drawings may be implemented as a computer program product. The computer program product may include a non-transitory computer-readable medium (or a storage medium) including computer-readable program instructions for allowing the at least one processor 181 to perform image processing and/or training of models. Non-limiting examples of a computer-readable instruction may include an assembler instruction, an instruction set architecture (ISA) instruction, a machine instruction, a machine dependent instruction, a micro-code, a firmware instruction, state setting data, or a source code or object code written in at least one programming language.

The computer-readable medium may be, e.g., an arbitrary type of medium for non-temporarily keeping and storing instructions executed by the at least one processor 181 or an arbitrary instruction-executable device. The computer-readable medium may be, but is not limited to, an electronic storage device, a magnetic storage device, an optical storage device, an electromagnetic storage device, a semiconductor storage device, or an arbitrary combination thereof. For example, the computer-readable medium may be a portable computer disk, a hard disk, RAM, read-only memory (ROM), electrically erasable read only memory (EEPROM), flash memory, static RAM (SRAM), a compact disk (CD), a digital video disk (DVD), a memory stick, a floppy disk, a mechanically encoded device such as a punch card, or an arbitrary combination thereof.

Figure 19:
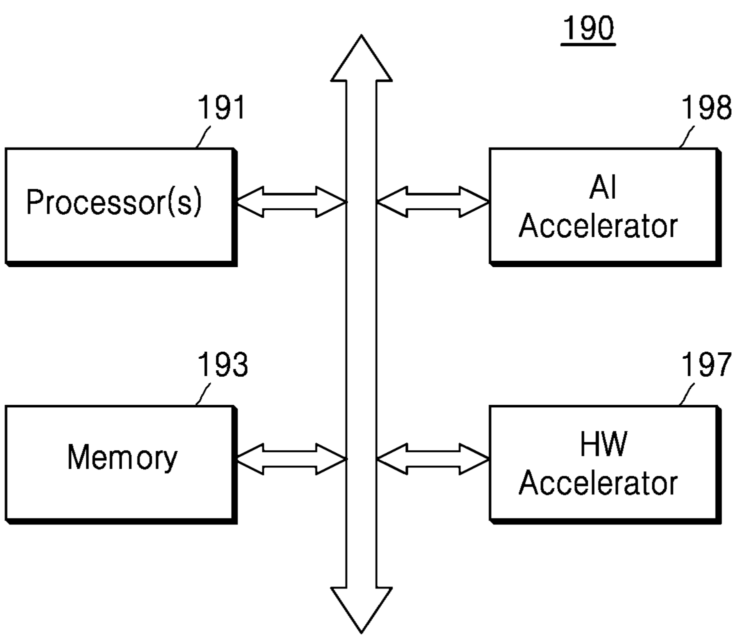
FIG. 19 is a block diagram of a system according to at least one embodiment.

FIG. 19 is a block diagram of a system 190 according to at least one embodiment. According to some embodiments, a layout simulation according to the embodiments may be executed by the system 190.

Referring to FIG. 19, the system 190 may include at least one processor 191, a memory 193, an artificial intelligence (AI) accelerator 195, and a hardware accelerator 197, and the at least one processor 191, the memory 193, the AI accelerator 195, and the hardware accelerator 197 may communicate with one another through a bus 199. According to some embodiments, the at least one processor 191, the memory 193, the AI accelerator 195, and the hardware accelerator 197 may be included in one semiconductor chip and/or processing circuitry. According to some embodiments, at least two of the at least one processor 191, the memory 193, the AI accelerator 195, and the hardware accelerator 197 may be included in each of two or more semiconductor chips mounted on a board.

The at least one processor 191 may execute instructions. For example, the at least one processor 191 may execute instructions stored in the memory 193 to execute an OS or applications executed on the OS. According to some embodiments, the at least one processor 191 may execute instructions to instruct the AI accelerator 195 and/or the hardware accelerator 197 to perform an operation, and to obtain a performance result of the operation from the AI accelerator 195 and/or the hardware accelerator 197. According to some embodiments, the at least one processor 191 may be an application specific instruction set processor (ASIP) customized for a certain purpose and may support a dedicated instruction set.

The memory 193 may have a structure which stores data. For example, the memory 193 may include a volatile memory device such as dynamic RAM (DRAM) or SRAM, and moreover, may include a non-volatile memory device such as flash memory or resistive RAM (RRAM). The at least one processor 191, the AI accelerator 195, and the hardware accelerator 197 may store data in the memory 193 through the bus 199 and/or may read the data from the memory 193.

The AI accelerator 195 may refer to hardware designed for AI applications. According to some embodiments, the AI accelerator 195 may include a neural processing unit (NPU) for implementing a neuromorphic structure and may generate output data by processing input data provided from the at least one processor 191 and/or the hardware accelerator 197 and may provide the output data to the at least one processor 191 and/or the hardware accelerator 197. According to some embodiments, the AI accelerator 195 may be programmable and may be programmed by the at least one processor 191 and/or the hardware accelerator 197.

The hardware accelerator 197 may be referred to as hardware designed to perform a certain operation at a high speed. For example, the hardware accelerator 197 may be designed to perform data conversion such as demodulation, modulation, encoding, or decoding at a high speed. The AI accelerator 197 may be programmable and may be programmed by the at least one processor 191 and/or the hardware accelerator 197.

According to some embodiments, the AI accelerator 195 may execute the machine learning models described above with reference to the drawings. For example, the AI accelerator 195 may execute each of the layers described above. The AI accelerator 195 may process an input parameter, a feature map, and/or the like to generate an output including useful information. According to some embodiments, at least some of models executed by the AI accelerator 195 may be executed by the at least one processor 191 and/or the hardware accelerator 197.

While the inventive concepts have been particularly shown and described with reference to some embodiments thereof, it will be understood that various changes in form and details may be made therein without departing from the spirit and scope of the following claims.

What is claimed is:

1. A method for simulating a layout of an integrated circuit manufactured by a semiconductor process, the method comprising:
- extracting a plurality of pattern layouts from layout data that defines the layout;
- generating training data by amplifying the plurality of pattern layouts and at least one parameter provided from the semiconductor process;
- generating sample data by sampling the training data;
- generating feature data including a three-dimensional array from the sample data;
- providing the sample data and the feature data to a simulator and a machine learning model, respectively; and
- training the machine learning model based on an output of the machine learning model and an output of the simulator.

2. The method of claim 1, wherein the extracting of the plurality of pattern layouts comprises:
- pre-processing the layout data based on information about a plurality of reference patterns;
- grouping patterns respectively corresponding to the plurality of reference patterns from the pre-processed layout data into a plurality of groups; and
- extracting coordinates of the plurality of pattern layouts respectively corresponding to the plurality of groups.

3. The method of claim 2, wherein the pre-processing of the layout data comprises adjusting a resolution of the layout data to correspond to information about the plurality of reference patterns or a resolution of the feature data.

4. The method of claim 2, wherein the pre-processing of the layout data comprises flattening a hierarchy included in the layout data.

5. The method of claim 1, wherein the generating of the training data comprises performing a design of experiments (DOE) by sampling the at least one parameter.

6. The method of claim 1, wherein the generating of the sample data comprises:
- providing the feature data corresponding to the training data to the machine learning model and collecting a plurality of outputs of a hidden layer of the machine learning model; and
- grouping the plurality of outputs of the hidden layer into a plurality of groups; and
- sampling the sample data from the training data based on the plurality of groups.

7. The method of claim 6, wherein the generating of the sample data further comprises:
- training the machine learning model so that a Lipschitz constant in a latent space of the plurality of outputs decreases.

8. The method of claim 1, wherein the generating of the feature data comprises:
- transforming a pattern layout included in the sample data based on at least one parameter included in the sample data;
- generating a plurality of two-dimensional arrays respectively corresponding to a plurality of layers of the transformed pattern layout; and
- generating the three-dimensional array including the plurality of two-dimensional arrays.

9. The method of claim 8, wherein the generating of the feature data further comprises:
- generating a new layer from at least one of the plurality of layers based on the at least one parameter included in the sample data; and
- generating a two-dimensional array corresponding to the new layer.

10. The method of claim 1, wherein the machine learning model comprises:
- a first sub-model configured to receive the three-dimensional array;
- a second sub-model configured to receive at least one parameter included in the feature data; and a third sub-model configured to generate the output of the machine learning model from an output of the first sub-model and an output of the second sub-model.

11. The method of claim 10, wherein the third sub-model comprises a deconvolution layer, and the output of the machine learning model is a two-dimensional array.

12. The method of claim 11, wherein the feature data comprises:

a first three-dimensional array comprising two-dimensional arrays of same size as the output of the machine learning model; and a second three-dimensional array comprising two-dimensional arrays of a greater size than the output of the machine learning model, and the first sub-model comprises a model receiving the first three-dimensional array and a model receiving the second three-dimensional array.

13. A method for simulating a layout of an integrated circuit manufactured by a semiconductor process, the method comprising:

extracting a plurality of pattern layouts from layout data that defines the layout;

obtaining at least one distribution of parameters of the semiconductor process;

generating at least one input parameter by sampling the at least one distribution;

generating feature data including a three-dimensional array from the plurality of pattern layouts and the at least one input parameter;

providing the feature data to a machine learning model trained based on an output of a simulator; and verifying the layout based on an output of the machine learning model, wherein verifying the layout comprises generating verification data, and the verification data includes a value indicating reliability of a pattern layout of the plurality of pattern layouts.

14. The method of claim 13, wherein the obtaining of the at least one distribution comprises obtaining at least one distribution from a process model that models the semiconductor process.

15. The method of claim 13, wherein the generating of the at least one input parameter comprises generating the at least one input parameter by performing Monte Carlo sampling on the at least one distribution.

16. The method of claim 13, wherein the verifying of the layout comprises calculating a standard score from the output of the machine learning model based on a threshold value.

17. The method of claim 16, wherein the calculating of the standard score comprises:

counting an output of the machine learning model that is less than or equal to the threshold value;

calculating a probability based on a result of the counting; and calculating the standard score based on the probability.

18. The method of claim 16, wherein the calculating of the standard score comprises:

calculating a probability based on the threshold value and importance sampling; and calculating the standard score based on the probability.

19. The method of claim 16, wherein the verifying of the layout comprises:

collecting standard scores corresponding to a plurality of pattern layouts; and calculating a reliability index of the integrated circuit, based on the collected standard scores.

20. A system comprising:

at least one processor; and a non-transitory storage medium storing instructions which, when executed by the at least one processor, allow the at least one processor to perform the method of claim 13.

* * * * *